(12) United States Patent
Kitamura

(10) Patent No.: US 6,813,048 B2
(45) Date of Patent: Nov. 2, 2004

(54) COMPUTER-GENERATED HOLOGRAM FABRICATION PROCESS, AND HOLOGRAM-RECORDED MEDIUM

(75) Inventor: Mitsuru Kitamura, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 29 days.

(21) Appl. No.: 10/320,630

(22) Filed: Dec. 17, 2002

(65) Prior Publication Data

US 2003/0156306 A1 Aug. 21, 2003

(30) Foreign Application Priority Data

Dec. 17, 2001 (JP) ........................ 2001-383339

(51) Int. Cl.⁷ ................................................ G03H 1/08
(52) U.S. Cl. .................. 359/9; 359/2; 359/22; 359/32; 283/86
(58) Field of Search ................ 359/2, 3, 9, 22, 359/32, 33; 382/210, 214; 283/86

(56) References Cited

U.S. PATENT DOCUMENTS

| 5,400,155 | A | * | 3/1995 | Ueda et al. .................... 359/9 |
| 5,497,254 | A | | 3/1996 | Amako et al. |
| 5,717,509 | A | | 2/1998 | Kato et al. |
| 6,369,919 | B1 | * | 4/2002 | Drinkwater et al. ........... 359/2 |

FOREIGN PATENT DOCUMENTS

| JP | 2001-083866 A | 3/2001 |
| JP | 2001-100622 A | 4/2001 |

OTHER PUBLICATIONS

G. Tricoles, "Computer Generated Holograms: An Historical Review", *Applied Optics*, vol. 26, No. 20, pp. 4351–4360, Oct. 15, 1987, XP001032080.

* cited by examiner

*Primary Examiner*—Leo Boutsikaris
(74) *Attorney, Agent, or Firm*—Sughrue Mion, PLLC

(57) ABSTRACT

A computer-generated hologram fabrication process that enables a plurality of original images to be observed with master-slave relations Original images 11, 12, a recording surface 20 and reference light R are defined on a computer, and a number of point light sources P11-1, ..., P12-1, ... as samples are defined on each original image. Given angles of spreading of object light beams emitted from individual point light sources are defined, and areas on the recording surface 20, at which object light beams emitted from point light sources defined on each original image 11, 12 with the thus limited given angles of spreading arrive, are determined as recording areas $\alpha 11$ and $\alpha 12$ corresponding to the original images 11 and 12. When there is an overlapping (hatched) portion in the recording areas, the overlapping portion is determined as a recording area corresponding to the master original image.

14 Claims, 19 Drawing Sheets

Precedence of original image 11 located nearer to the position of viewing

Precedence of original image 12 for ther off the position of viewing

FIG. 21(a)
FIG. 21(b)
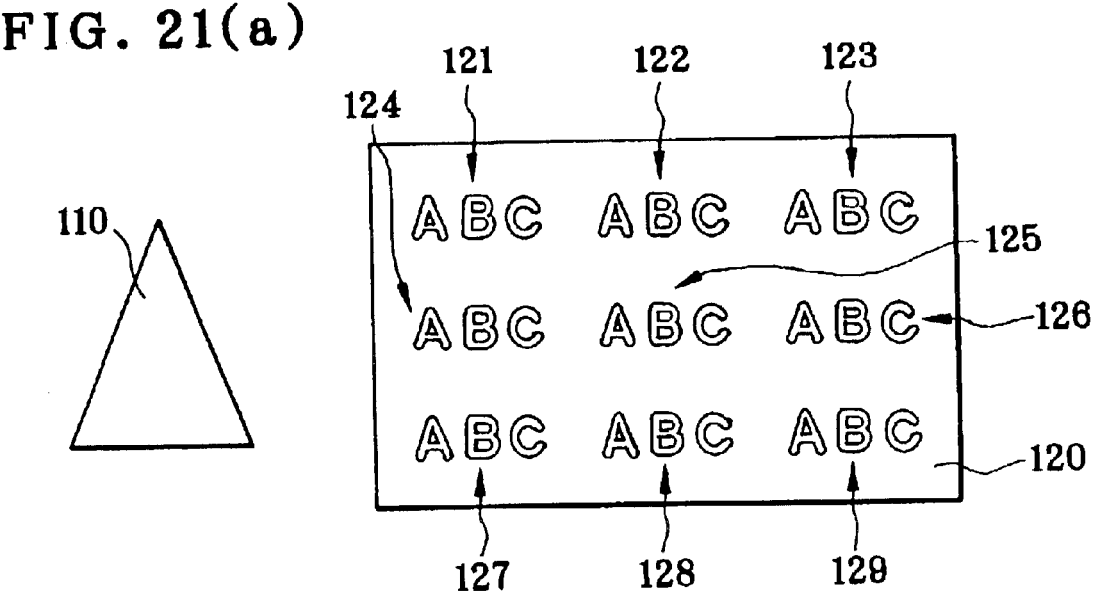
FIG. 22
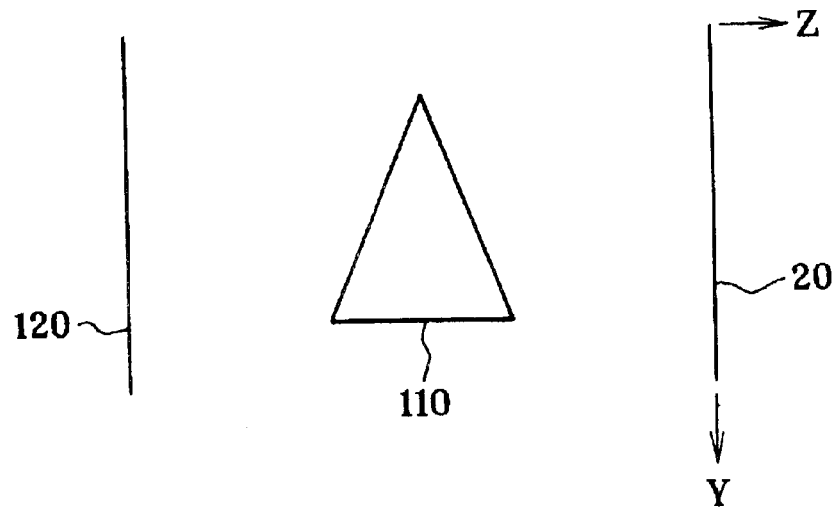

| Original image | Recording area | Original image | Recording area |
|---|---|---|---|
| 110 | α110 | 125 | α125 |
| 121 | α121 | 126 | α126 |
| 122 | α122 | 127 | α127 |
| 123 | α123 | 128 | α128 |
| 124 | α124 | 129 | α129 |

Precedence of original image 110 located nearer to the position of viewing

Precedence of original images 121~129 for ther off the position of viewing

| Original image | Recording area |
|---|---|
| 110 | α110 |
| 131 | α131 |
| 132 | α132 |
| 133 | α133 |

Precedence of original image 110 located nearer to the position of viewing

Precedence of original images 131~133 for ther off the position of viewing

FIG. 35

| A(x,y) / θ(x,y) | 0~25% | 25~50% | 50~75% | 75~100% |
|---|---|---|---|---|
| $0 \sim \frac{\pi}{2}$ | Refractive index : n1 | Refractive index : n1 | Refractive index : n1 | Refractive index : n1 |
| $\frac{\pi}{2} \sim \pi$ | Refractive index : n2 | Refractive index : n2 | Refractive index : n2 | Refractive index : n2 |
| $\pi \sim \frac{3}{2}\pi$ | Refractive index : n3 | Refractive index : n3 | Refractive index : n3 | Refractive index : n3 |
| $\frac{3}{2}\pi \sim 2\pi$ | Refractive index : n4 | Refractive index : n4 | Refractive index : n4 | Refractive index : n4 |

Amplitude A

Phase θ

FIG. 36

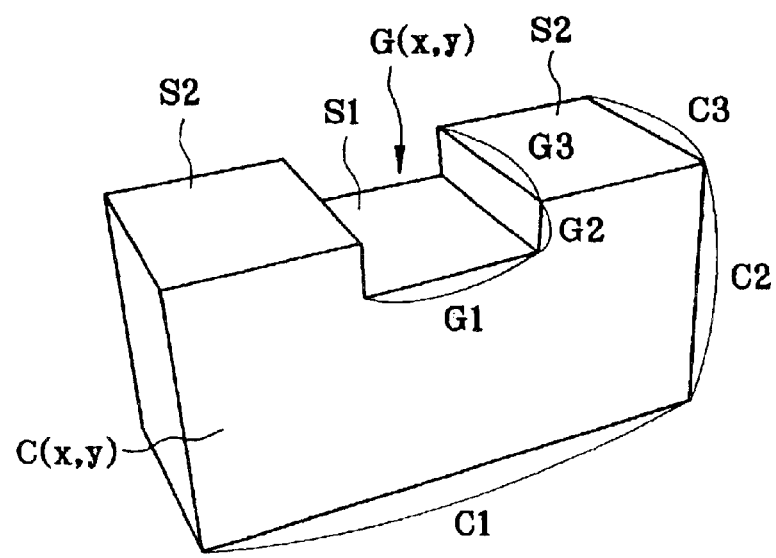

COMPUTER-GENERATED HOLOGRAM FABRICATION PROCESS, AND HOLOGRAM-RECORDED MEDIUM

BACKGROUND OF THE INVENTION

The present invention relates to a hologram-recorded medium and a process for the fabrication of the same, and more particularly to a process for the fabrication of a computer-generated hologram in which interference fringes are formed on a given recording surface by computer-aided computation and a hologram-recorded medium obtained by the same.

In recent years, coherent light has been easily obtainable by use of lasers, and holograms have been widely commercialized as well. Especially for notes and credit cards, the formation of holograms on portions of their media has become popular for anti-counterfeiting purposes.

Today's commercially available holograms are obtained by recording original images on media in form of interference fringes, using optical techniques. That is, an object that forms an original image is first provided. Then, light from this object and reference light are guided through an optical system such as a lens onto a recording surface with a photosensitive agent coated thereon to form interference fringes on the recording surface. Although this optical technique requires an optical system of some considerable precision for the purpose of obtaining sharp reconstructed images, it is the most straightforward method for obtaining holograms and so becomes most widespread in industry.

On the other hand, techniques for forming interference fringes on a recording surface by computer-aided computations for the fabrication of holograms, too, have been known to those skilled in the art. A hologram fabricated by such techniques is generally called a computer-generated hologram (CGH for short) or referred to simply as a computer hologram. This computer hologram is obtained by computer simulation of a process of generation of optical interference fringes, which process is all performed through computer-aided computations. Once image data on an interference fringe pattern have been obtained by such computations, physical interference fringes are formed on an actual medium. A specific technique has already been put to practical use, in which image data on a computer-generated interference fringe pattern are given to an electron beam lithographic system, so that the data are scanned by electron beams on a medium thereby forming physical interference fringes on the medium.

While keeping pace with recent developments of computer graphics, computer-aided processing of various images is being generalized in the printing industry. For the original images to be recorded in holograms, too, it is thus convenient to provide them in the form of image data. In consideration of such demands, techniques for generating computer holograms are of growing importance, and expected to take over optical hologram fabrication methods at some future time.

As explained above, significantly important commercial exploitations of holograms are to use them as anti-counterfeiting means for notes, credit cards or the like. To further enhance the anti-counterfeiting effect in such applications, it is effective to record a plurality of original images in the form of holograms. For instance, if the first original image comprising a pattern of size large enough for visual perception and the second original image comprising a pattern of visually unperceivable size are recorded on the same recording medium, then authentication can be carried out by observing the first original image. For the purpose of stricter authentication, it is possible to observe the second original image under loupes, microscopes or the like, thereby making more precise authentication. If microcharacters having a maximum size of up to 300 μm are used for the second original image, they visually looks just like a simple striped pattern, but they can be perceived as characters under loupes, microscopes or the like.

In commercial applications, holograms are used as ornamental materials for commodities, for instance, in the form of cards, key holders, and ornamental articles. In such applications, too, it is effective to record a plurality of original images thereby improving the decorative effects of the holograms. For instance, if the first original image that is a master motive and the second original image functioning as a background pattern are recorded on the same recording medium, it is then possible to obtain a great-looking 3D appearance at the time of viewing. It is understood that three or more original images may be recorded as holograms in the same recording medium.

However, illumination environments for reconstruction of commercially exploited hologram-recorded media are usually far from ideal. By definition, the illumination environment ideal for reconstruction is an environment wherein a hologram is irradiated with illumination light comprising the same monochromatic light as used for recording reference light from the same direction as applied for recording. In the real world, however, hologram images are hardly reconstructed in such an ideal illumination environment. That is, in daily life, hologram images are reconstructed in illumination environments having a broad range of wavelengths, e.g., under sunbeams in outdoor conditions and under electric bulbs within rooms, and so reconstructed images are much inferior in sharpness to ideal reconstructed images. For this reason, when images are reconstructed from a hologram-recorded medium with a plurality of original images recorded therein, plural reconstructed images are prima facie obtainable, but individual reconstructed images lack sharpness, providing generally blurred, flat images. Especially with a hologram fabricated in such a way that a plurality of original images having master-slave relations are recorded with some intents, e.g., a hologram having a combined master motive and background pattern, they are observed in a fused state where the master-slave relations are little identified.

SUMMARY OF THE INVENTION

It is thus the primary object of the present invention to provide a computer-generated hologram that enables a plurality of original images to be viewed with master-slave relations as intended even when a hologram image is reconstructed in daily illumination environments, and a process for the fabrication of the same.

(1) According to the first embodiment of the present invention, there is provided a process of the fabrication of a computer-generated hologram with interference fringes recorded on a given recording surface by computer-aided computations, which comprises steps of:

defining 2 to K original images, a recording surface for recording the original images and reference light with which the recording surface is irradiated and which corresponds to the 2 to K original images, defining a multiplicity of sample light sources on each original image, defining a given angle of spreading for object light emitted from individual sample light sources, determining an area on the recording surface, at which object light emitted from all sample light sources defined on one original image arrive with a limited angle of spreading, as a recording area corresponding to said one original image, thereby defining recording areas corresponding to each of the K original images, assigning priorities to a plurality of recording areas when the plurality of recording areas overlap one another on the recording surface, so that a recording area having higher priority is preceded over the rest with respect to an overlapping portion, thereby eliminating the overlapping portion, defining a multiplicity of computation points on the recording surface so that on each computation point, the intensity of interference fringes formed by reference light and object light emitted from sample light sources on the original image corresponding to the recording area to which said computation point is allocated and from which the overlapping has been eliminated is found by computation, and forming interference fringes comprising a distribution of intensities of interference fringes found on each computation point as a hologram on the recording surface.

(2) According to the second embodiment of the present invention, there is provided a process of the fabrication of a computer-generated hologram with an optical pattern recorded on a given recording surface by computer-aided computations, which comprises steps of:

defining 2 to K original images and a recording surface for recording the original images, defining a multiplicity of sample light sources on each original image, defining a given angle of spreading for object light emitted from individual sample light sources, determining an area on the recording surface, at which object light emitted from all sample light sources defined on one original image arrive with a limited angle of spreading, as a recording area corresponding to said one original image, thereby defining recording areas corresponding to each of the K original images, assigning priorities to a plurality of recording areas when the plurality of recording areas overlap one another on the recording surface, so that a recording area having higher priority is preceded over the rest with respect to an overlapping portion, thereby eliminating the overlapping portion, and defining a multiplicity of computation points on the recording surface, so that on each computation point, the complex amplitude at the position of said computation point of object light emitted from sample light sources on the original image corresponding to the recording area, to which said computation point is allocated and from which an overlapping portion has been eliminated, is computed thereby defining a specific amplitude and a specific phase on individual computation points, and locating a physical cell having optical properties consistent with the specific amplitude and specific phase in the vicinity of individual computation points so that a hologram-recording surface for the K original images is formed by a set of physical cells.

(3) According to the third embodiment of the present invention, there is provided a computer-generated hologram fabrication process according to the first or second embodiment, wherein:

the position of viewing a hologram reconstructed image is predetermined so that higher priority is assigned to a recording area corresponding to an original image located at a position nearer to the position of viewing.

(4) According to the fourth embodiment of the present invention, there is provided a computer-generated hologram fabrication process according to the first or second embodiment, wherein:

the position of viewing a hologram reconstructed image is predetermined so that higher priority is assigned to a recording area corresponding to an original image located at a position farther off the position of viewing.

(5) According to the fifth embodiment of the present invention, there is provided a computer-generated hologram fabrication process according to any one of the 1st to 4th embodiments, wherein:

the recording surface is located on an XY plane to limit the angles of spreading, θx and θy, of object light in the X-axis and Y-axis directions, said object light being emitted from each sample light source defined as a point light source toward the Z-axis direction.

(6) According to the sixth embodiment of the present invention, there is provided a computer-generated hologram fabrication process according to any one of the 1st to 4th embodiments, wherein:

a unit area having given size is defined so that the angle of spreading is defined for individual sample light sources in such a way that object light emitted from one sample light source reaches only within the unit area on the recording surface.

(7) According to the seventh embodiment of the present invention, there is provided a computer-generated hologram fabrication process according to any one of the 1st to 4th embodiments, wherein:

the recording surface is located on an XY plane, so that the angle of spreading in the X-axis direction of object light emitted from each sample light source defined as a point light source toward the Z-axis direction is defined as a given angle θx and the angle of spreading of the object light in the Y-axis direction is defined as an angle satisfying a condition under which object light emitted from one sample light source reaches only within an area on the recording surface and having a given width Ly in the Y-axis direction.

(8) According to the eighth embodiment of the present invention, there is provided a computer-generated hologram fabrication process according to any one of the 1st to 4th embodiments, wherein:

the recording surface is located on an XY plane and a plurality of sections parallel with an XZ plane are located at a given spacing D, thereby defining sample light sources lined up at a given spacing on a sectional line obtained by cutting the surface of an original image by each section, and each line of intersection of the recording surface with each section is allowed to have a given width thereby forming a strip area and the angle of spreading in the Y-axis direction of object light emitted from sample light sources lined up on a sectional line by a j-th section is defined in such a way as to satisfy a condition under which the object light reaches only within a strip area formed with respect to a line of intersection of the j-th section with the recording surface.

(9) According to the ninth embodiment of the present invention, there is provided a hologram-recorded medium in which a hologram optical pattern fabricated by the computer-generated hologram fabrication process according to any one of the 1st to 8th embodiments is recorded on a hologram medium such as a master medium written by an electron beam lithographic system, a replica made using the master medium, and a medium obtained by forming a reflecting layer on the replica.

(10) According to the tenth embodiment of the present invention, there is provided a hologram-recorded medium in which there is recorded information about a plurality of original images that are located at positions where projected images overlap upon projection onto a recording surface in a direction vertical thereto, wherein:

on the recording surface of the medium there are formed a plurality of recording areas that do not spatially overlap one another, and in one recording area there is recorded only information about object light emitted from a multiplicity of sample light sources that form one original image to be recorded.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the of the invention will be indicated in the claims.

BRIEF DESCRIPTION OF THE DRAWINGS

FIGS. 21(a) and 21(b) are front schematics illustrative often original images used in a more specific embodiment of the present invention with FIG. 21(a) illustrative of one original image and FIG. 21(b) of nine original images.

FIG. 22 is a side view of the location of how the original images shown in FIG. 21 are located in the rear of the recording surface 20.

FIG. 35 is illustrative of variations of a physical cell that may herein be used.

FIG. 36 is a perspective schematic illustrative of one exemplary structure of a physical cell C(x, y) that may herein be used.

DESCRIPTION OF THE PREFERRED EMBODIMENTS

The present invention is now explained specifically with reference to the preferred embodiments shown in the accompanying drawings.

§1. Fundamental Principles of the Computer-Generated Hologram

Figure 1:
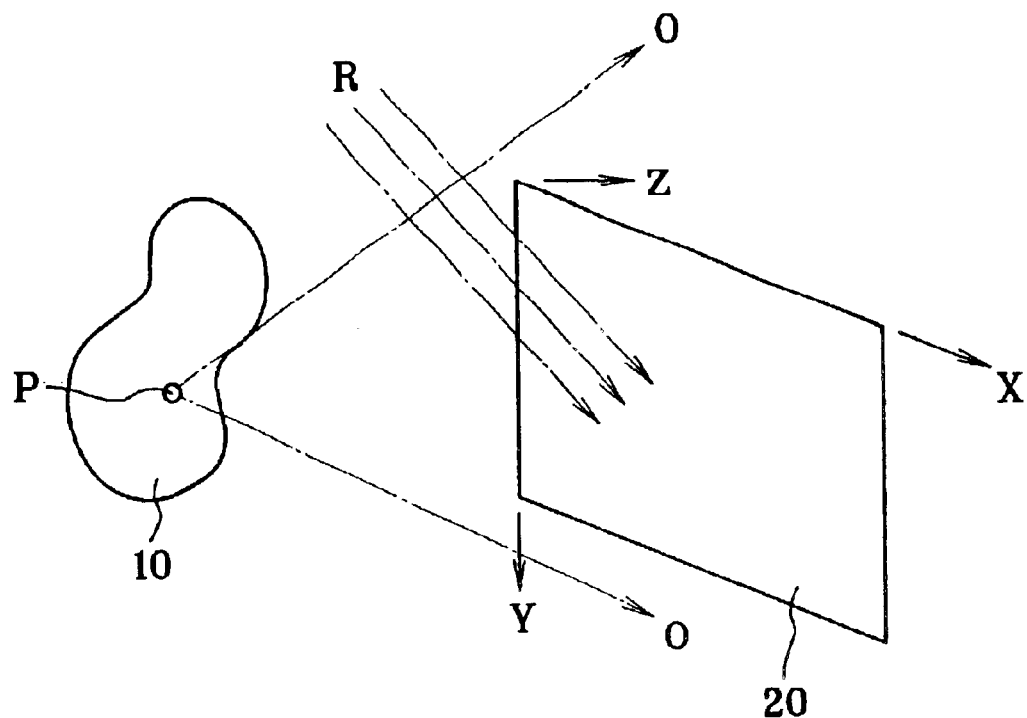
FIG. 1 is illustrative of the principles of a general hologram fabrication process, wherein an original image 10 is recorded as interference fringes on a recording surface 20.

First of all, the fundamental principles of a general computer-generated hologram are briefly explained. FIG. 1 is illustrative of the principles of how to fabricate a general hologram, showing how to record an original image 10 in the form of interference fringes on a recording surface 20. For convenience of explanation, assume here that the recording surface 20 is placed on an XY plane on the XYZ three-dimensional coordinate system defined as shown in FIG. 1. When the optical technique is used, an actual object or its real or virtual image is provided as the original image 10. Object light O emanating from an arbitrary point P on the original image 10 propagates toward the whole recording surface 20. On the other hand, the recording surface 20 is irradiated with reference light R, so that interference fringes of object light O and reference light R are recorded on the recording surface 20.

Figure 2:
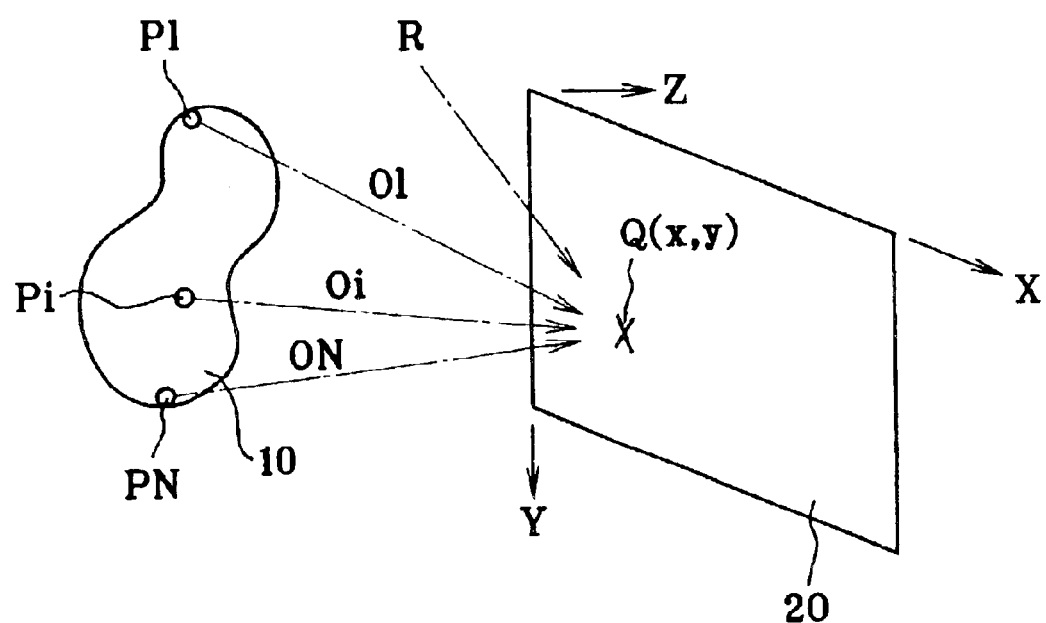
FIG. 2 is illustrative of the principles of a general computer-generated hologram fabrication process, showing how to compute the intensity of interference waves on a computation point Q(x, y) on a recording surface 20.

To fabricate a computer-generated hologram at the position of the recording surface 20, the original image 10, recording surface 20 and reference light R are each defined in the form of data on a computer, so that the intensity of interference waves at each position on the recording surface 20 can be calculated. Specifically, assume that the original image 10 is processed as a set of N sample light sources P1, P2, P3, ..., Pi, ..., PN, as shown in FIG. 2, and that object light beams O1, O2, O3, ..., Oi, ..., ON from the respective sample sources propagate toward a computation point Q(x, y) when reference light R is directed toward the computation point Q(x, y). Then, the intensity of amplitude at the computation point Q(x, y) of interference waves created by interference of these N object light beams O1 to ON and reference light R is found by computation. Although point light sources capable of transmitting object light as spherical waves are used as the sample light sources P, it is acceptable to use line sources or minute surface illuminants as the sample light sources. The sample light sources used do not necessarily emit light by themselves, and so may have the property of producing object light by reflection of some illumination light. Usually, the original image 10 is defined as an assembly of many polygons and for each polygon, its direction or reflectivity on a three-dimensional space is defined. Accordingly, given a certain illumination environment, object light may be defined as reflected light from an arbitrary point on the original image 10.

On the other hand, a multiplicity of computation points consistent with the necessary resolution are defined on the recording surface 20, and the intensity of amplitude for each computation point is computed so that the intensity distribution of interference waves is obtained on the recording surface 20. In this embodiment, a matrix array of numerous computation points Q(x, y) are defined on the recording surface 20 at a pitch of 0.6 μm in the X-axis direction and at a pitch of 0.25 μm in the Y-axis direction, and for each computation point the intensity value of amplitude of interference fringes is found. The pitch of computation points defined on the recording surface 20 is not always limited to the aforesaid value; to record interference fringes for obtaining a hologram reconstructed image, however, it is required that a multiplicity of computation points be defined at a fine pitch consistent with the wavelength range of light.

Thus, the intensity distribution of an interference fringe pattern consistent with the resolution of the array of computation points (0.6 μm in the X-axis direction and 0.25 μm in the Y-axis direction in the aforesaid embodiment) is obtained on the recording surface 20, and such an intensity distribution is represented as image date on a two-dimensional plane. If, on the basis of the image data, physical interference fringes (physical light-and-shade or embossed patterns) are formed on a medium, then a computer-generated hologram can be fabricated. To form interference fringes of high resolution on a medium, it is preferable to rely on an electron beam lithographic system that is widely used in applications where mask patterns for semiconductor integrated circuits are written, and functions to perform electron beam scanning with high precision. Therefore, if image data indicative of the intensity distribution of interference waves found by computation are provided to an electron beam lithographic system for electron beam scanning, it is then possible to write an interference fringe pattern consistent with that intensity distribution.

It is here noted that a common electron beam lithographic system has only a function of controlling writing/non-writing, thereby writing a binary image; that is, it is general to subject the intensity distribution found by computation to binary operation and give the resultant binary image data to the electron beam lithographic system. In other words, the given intensity value of amplitude is defined by the aforesaid computation on each computation point Q(x, y). Accordingly, if a given threshold value (e.g., an average of all intensity values of amplitude distributed over the recording surface 20) is set, a pixel value "1" is imparted to a computation point having an intensity value of greater than that threshold value while a pixel value "0" to a computation point having an intensity value of less than that threshold value, and each computation point Q(x, y) is converted to a pixel D(x, y) having a pixel value "1" or "0", then a binary image comprising a set of a multiplicity of pixels D(x, y) is obtained. If the binary image data are given to the electron beam lithographic system for image writing, then the interference fringes can be written in the form of a physical binary image. In actual applications, however, an embossed medium that is a master hologram medium is fabricated on the basis of the thus physically written interference fringes, and embossment is carried out using that embossed hologram medium. In this way, it is possible to mass-fabricate holograms wherein the interference fringes are formed on the surface in the form of a pit-and-projection structure.

§2. Limitation of the Angle of Spreading

According to the aforesaid fundamental principles shown in FIG. 1, object light O emitted from an arbitrary point P on the original image 10 will arrive at the whole recording surface 20. As viewed from the side of an arbitrary computation point Q(x, y) on the recording surface 20 as shown in FIG. 2, this means that information carried by object light O1, O2, O3, . . . , Oi, . . . , ON emitted from all points P1, P2, P3, . . . , Pi, . . . , PN is recorded on that arbitrary computation point Q(x, y). Thus, the rudimentary principles of a hologram are that information about every portion of the original image 10 is recorded on every portion on the recording surface 20. Given the information recorded according to these basic principles, a 3D image is reconstructed on viewing. In the present invention, on the other hand, a specific technique that the angle of spreading of object light emitted from individual points on the original image 10 is utilized in place of a technique faithful to such basic principles of a hologram.

Figure 3:
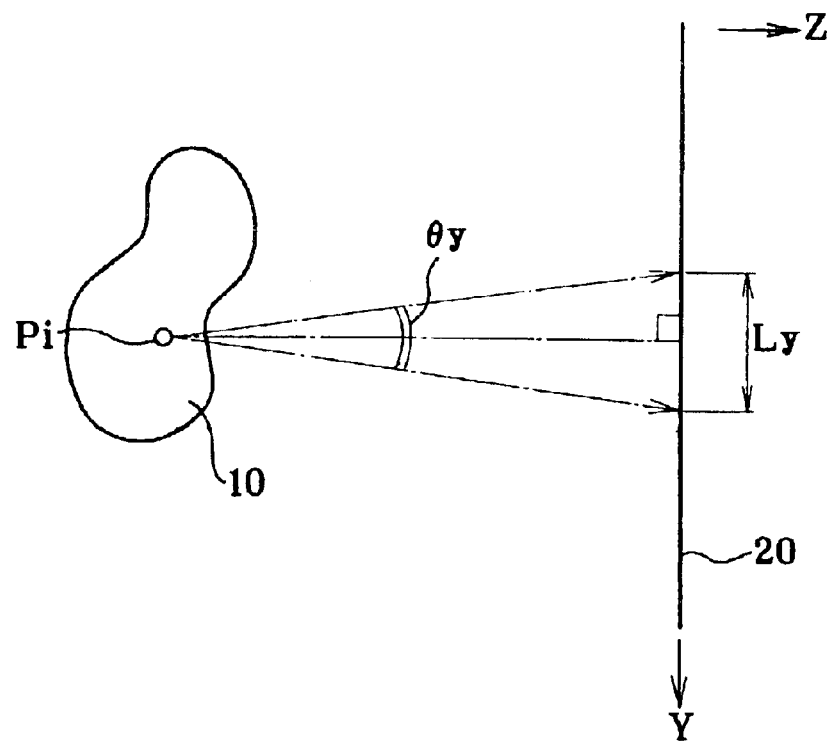
FIG. 3 is a side view illustrative of the principles of limiting the angle of spreading of object light emitted from a sample light source Pi on an original image 10.
Figure 4:
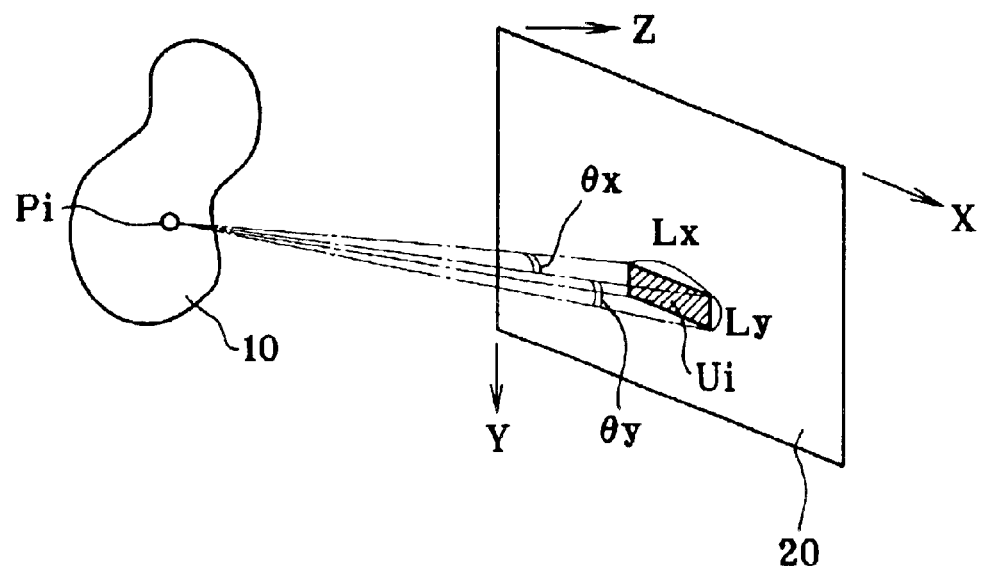
FIG. 4 is a perspective view illustrative of the principles of limiting the angle of spreading of object light emitted from the sample light source Pi on the original image 10.

For instance, consider now the case where a recording surface 20 is defined on an XY plane (with the X-axis in a direction vertical to the paper) and information about an original image 10 located in the rear thereof (in the left-hand direction) is recorded on the recording surface 20, as shown in FIG. 3. Suppose in this case that an i-th sample light source Pi defined on the original image 10 were a point light source. Object light emitted from this sample light source Pi, by definition, will take the form of spherical waves arriving at the whole recording surface 20. However, if the angle of spreading in the Y-axis direction of object light emitted from the sample light source Pi is limited to an angle θy with the center on a perpendicular (parallel with the Z-axis) to the recording surface 20 as shown in FIG. 3, the object light coming from the sample light source Pi will arrive at only a portion Ly of the width of the recording surface 20. Likewise, if the angle of spreading of the object light in the X-axis direction is limited to an angle θx, the object light coming from the sample light source Pi will arrive at only a portion of unit area Ui on the recording surface 20, as shown in FIG. 4. The unit area Ui in this case becomes a rectangular area wherein the lengths in the X-axis and Y-axis directions are given by Lx and Ly, respectively, as hatched in FIG. 4.

Thus, if specific limitations are imposed on the angles of spreading, θx and θy in the X-axis and Y-axis directions, of object light emitted from each sample light source defined as a point light source on the recording surface 20 located on the XY plane, then the rectangular area whose lengths in the X-axis and Y-axis directions are given by Lx and Ly, respectively, is defined as an area at which object light emitted from an individual sample light source arrives. Accordingly, if the same technique is used to limit the angles of spreading of object light coming from all of N sample light sources defined on the original image 10, then information about the original image 10 is recorded only within a specific recording area comprising a set of all of N rectangular areas (that overlap one another) defined on the recording surface 20. Thus, if the specific limiting condition is set for the angle of spreading of object light emitted from each sample light source on the original image, the area on the recording surface 20 is uniquely defined.

Thus, when computations are performed with a limited angle of spreading of object light, an interference fringe pattern obtained on the recording surface 20 does not provide an intrinsic hologram pattern, resulting in a failure in obtaining a correct 3D reconstructed image. For instance, when the hologram is viewed from an oblique direction, no correct 3D image is obtainable. In actual applications such as anti-counterfeiting seals, however, even that hologram offers no practically grave problem, because of being capable of reproducing a reconstructed image ensuring some three-dimensional appearance when observed from a general direction of viewing.

Such a technique of fabricating a computer-generated hologram while the angle of spreading of object light from an original image is limited is already known as means for lifting up loads on computations. That is, with the technique of limiting the angle of spreading of object light, overall loads on computations can be substantially reduced because when computing the "amplitude intensity of interference waves occurring by interference of object light and reference light" on individual computation points defined on the recording surface 20, the number of object light beams (sample light sources) to be considered is strikingly reduced. The primary object of the present invention is that even when a hologram is reconstructed in daily illumination environments, a plurality of original images can be viewed with the master-slave relations as intended; reductions in loads on computations are not the primary object of the present invention. However, the "limitation of the angle of spreading of object light from an original image" is an essential element or precondition for carrying out the present invention.

§3. How to Specifically Define Sample Light Sources

In the present invention, it is required to define a multiplicity of sample light sources on the original image 10. For the sample light sources, any one of point, linear and surface light sources may be used. However, the present invention is here explained with only embodiments using point light sources. When point light sources are used as all sample light sources, only the determination of information about their positions on the original image is needed for the definition of the sample light sources. It is here noted that the intensity of object light is determined depending on the luminance, reflectivity, etc. of the original image at the positions of sample light sources. How to define the positions of sample light sources utilizing a plurality of mutually parallel sections is now explained.

Figure 5:
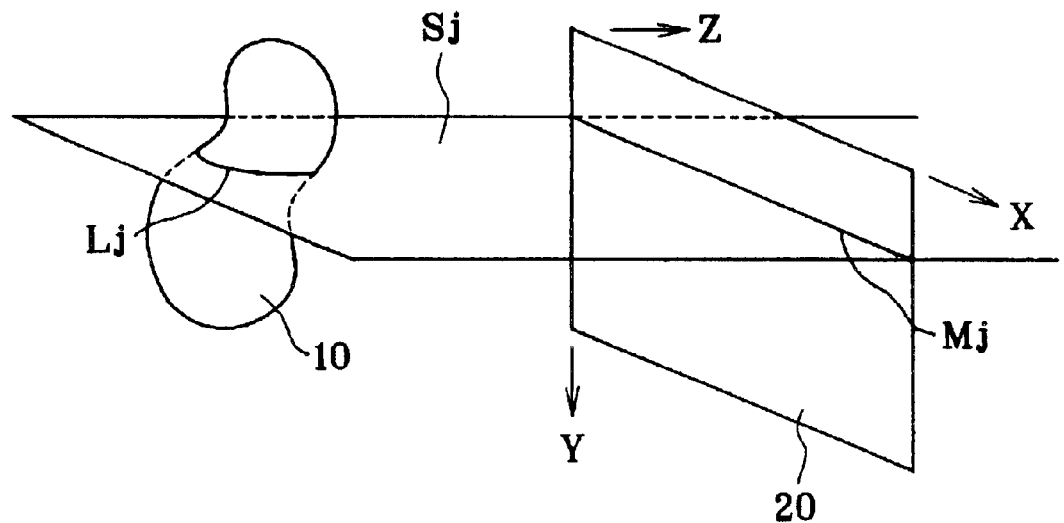
FIG. 5 is a perspective view of in what state an original image 10 and a recording surface 20 are cut by a section.

Consider now a plurality of sections, along which both an original image 10 and a recording surface 20 positioned on an XY plane, both located as shown in FIG. 5, are cut. Imagine here that each section is parallel with the XZ plane. A section Sj shown in FIG. 5 represents a j-th section of the plurality of sections. By cutting the surface of the original image 10 by the j-th section Sj, a j-th sectional line Lj is defined as shown in FIG. 5, and by cutting the recording surface 20 by the j-th section Sj, a j-th sectional line Mj is defined as shown in FIG. 5. Here the sectional line Mj formed on the recording surface 20 side is called a line of intersection Mj. Once the sectional line Lj has been defined on the original image 10 side in this way, a multiplicity of sample (point) light sources should be defined on the sectional line Lj at a given spacing.

Figure 6:
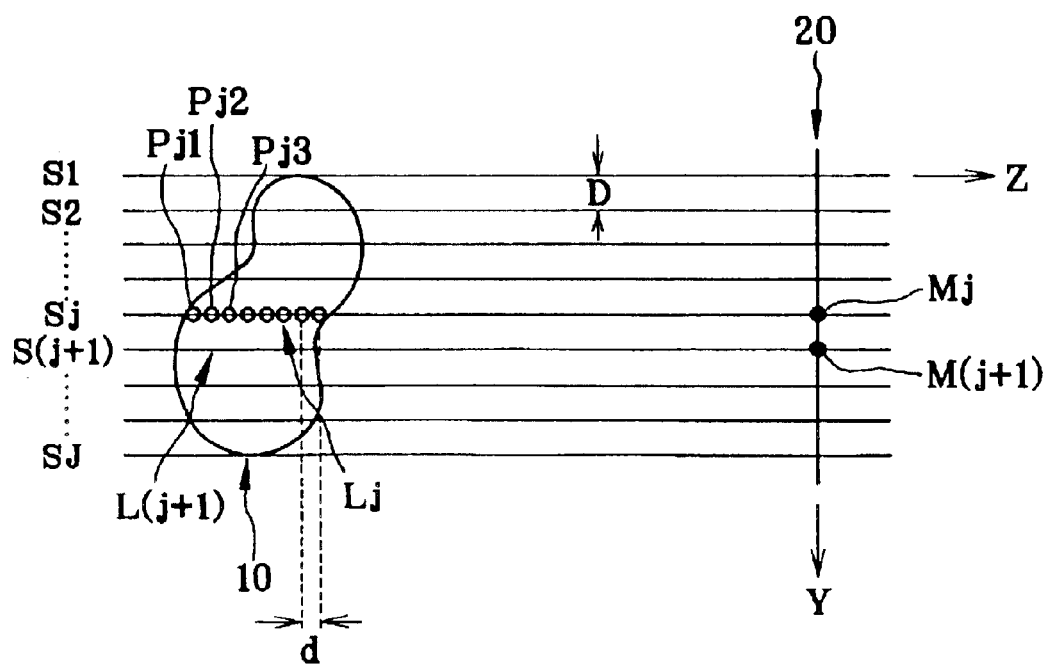
FIG. 6 is a side view illustrative of how to define a multiplicity of sample light sources on the surface of the original image 10.

FIG. 6 is a side view illustrative of how a multiplicity of sample light sources are defined on the surface of an original image 10. As shown, a total of J sections S1–SJ (that are all parallel with the XZ plane) are defined while adjacent sections are spaced away from each other at a given spacing D. If J sections S1–SJ are defined in this way, J sectional lines L1–LJ are defined on the original image 10 side at a given spacing D and J lines of intersection M1–MJ (vertical to the paper) are defined on the recording surface 20 side at a given spacing D. If sample light sources are defined on each of sectional lines L1–LJ at a given spacing d (that may be either a straight line spacing or an spacing of distance along each section), then it is possible to regularly define a multiplicity of sample light sources on the surface of the original image 10. As shown typically in FIG. 6, sample light sources Pj1, Pj2, Pj3, . . . are defined on a j-th sectional line Lj. The Y-coordinate values for these sample light sources Pj1, Pj2, Pj3, . . . coincide with the Y-coordinate value for a j-th line of intersection Mj on the recording surface 20 side. At a position that goes down from a sectional line Lj by the given spacing D, a (j+1)-th sectional line L(j+1) formed by a (j+1)-th section S(j+1) is defined, and a multiplicity of sample light sources (not shown) are defined on this sectional line L(j+1) at a given spacing d. The Y-coordinate values for these sample light sources coincide with the Y-coordinate value for a (j+1)-th line of intersection M(j+1).

Preferably in practical applications, both the intervals d and D should be varied in association with each other (otherwise, there may possibly be a case where the longitudinal resolution of a reconstructed image differs extremely from the lateral resolution thereof), because the section-to-section spacing D is a determinative factor for the longitudinal density of sample light sources and the spacing d between the sample light sources on the sectional line is a determinative factor for the lateral density of sample light sources. In this embodiment, therefore, a specific condition is set in such a way as to ensure that d is constantly equal to D/2; once the section-to-section spacing D has been determined, the spacing d between the sample light sources located on the sectional line can automatically be determined. Referring here to practical values for the section-to-section spacing D, it is preferable that 30 μm or greater is used for a visually perceivable original image (at less than 30 μm, the resolution becomes higher required, ending up with useless computations), and 30 μm or less is used for a visually unperceivable original image (e.g., micro-characters of 100 μm in height and 50 μm in width) (at 30 μm or greater micro-characters, etc. cannot be represented with adequate resolution).

Figure 7:
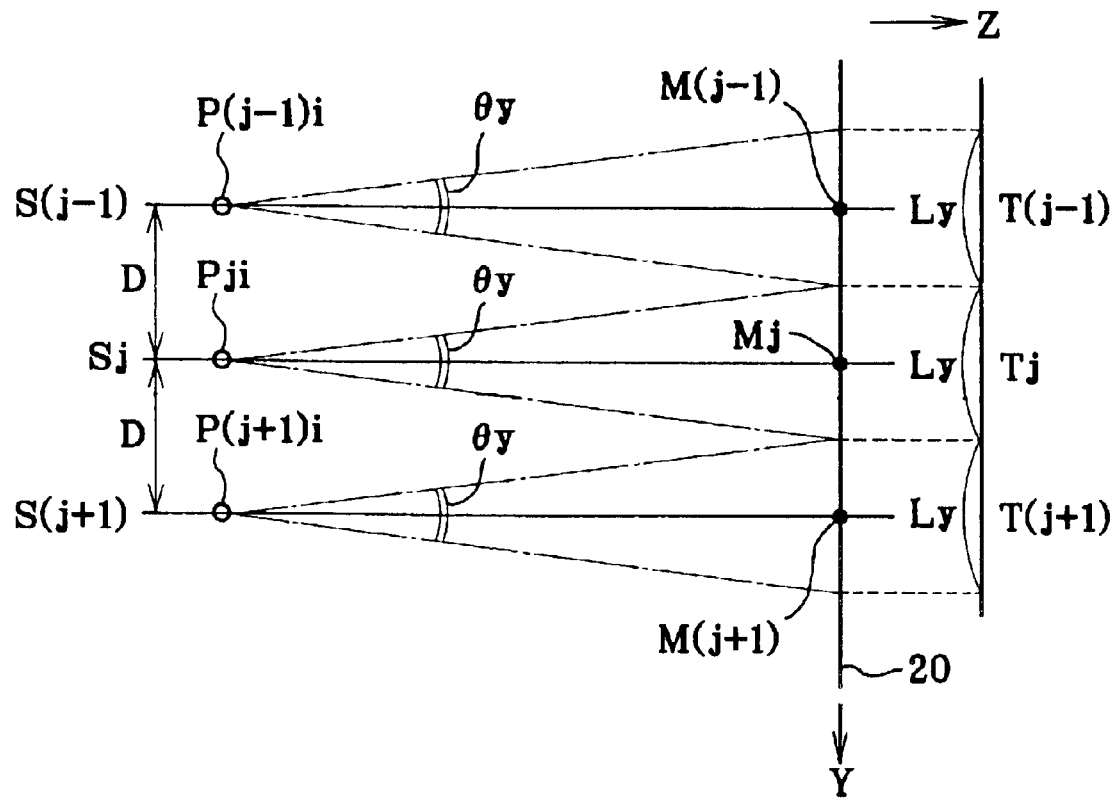
FIG. 7 is a side view illustrative of how to set the angle of spreading, showing only a portion of FIG. 6 on an enlarged scale.

Next, reference is made to a specific embodiment of the present invention wherein, as shown in FIG. 6, sample light sources comprising point light sources are defined utilizing a plurality of sections, and the angles of spreading of object light emitted from individual sample light sources are limited, so that the intensity of interference waves is computed on each computation point on a recording surface 20. FIG. 7 is a side view of how to set the angles of spreading, showing a portion of FIG. 6 on an enlarged scale. An i-th sample light source P(j−1)i defined on a sectional line by a(j−1)-th section S(j−1), an i-th sample light source Pji defined on a sectional line by a j-th section Sj, and an i-th sample light source P(j+1)i defined on a sectional line by a (j+1)-th section S(j+1) are shown as typical sample light sources. Shown by black circles (each taking the form of a line extending vertically to the paper), on the other hand, are a line of intersection M(j−1) with the (j−1)-th section S(j−1), a line of intersection Mj with the j-th section Sj and a line of intersection M(j+1) with the (j+1)-th section S(j+1).

Here, strip areas T(j−1), Tj and T(j+1) are defined by allowing the lines of intersection M(j−1), Mj and M(j+1) to have widths Ly in the Y-axis direction. Specifically, each strip area is in a rectangular form, which is slender in the lateral (X-axis) direction, and whose width in the Y-axis direction is given by Ly and whose width in the X-axis direction is given by the lateral width of the recording surface 20 with the center line defined by each line of intersection. For convenience of explanation, the recording surface 20 is shown on the right-hand side of FIG. 7; in practical applications, however, each strip area is given by a rectangular area defined on the recording surface 20. Here, if the width Ly of each strip area is made equal to the section-to-section spacing D, the recording surface 20 is thoroughly filled up with a number of strip areas, as shown. Then, if the angle of spreading, θy, in the Y-axis direction of object light emitted from each sample light source is set in such a way that the area irradiated with the object light comes within one strip area, for instance, object light from the sample light source P(j−1)i reaches only within the strip area T(j−1), object light from the sample light source Pji reaches only within the strip area Tj, and object light from the sample light source P(j+1)i reaches only within the strip area T(j+1).

Figure 8:
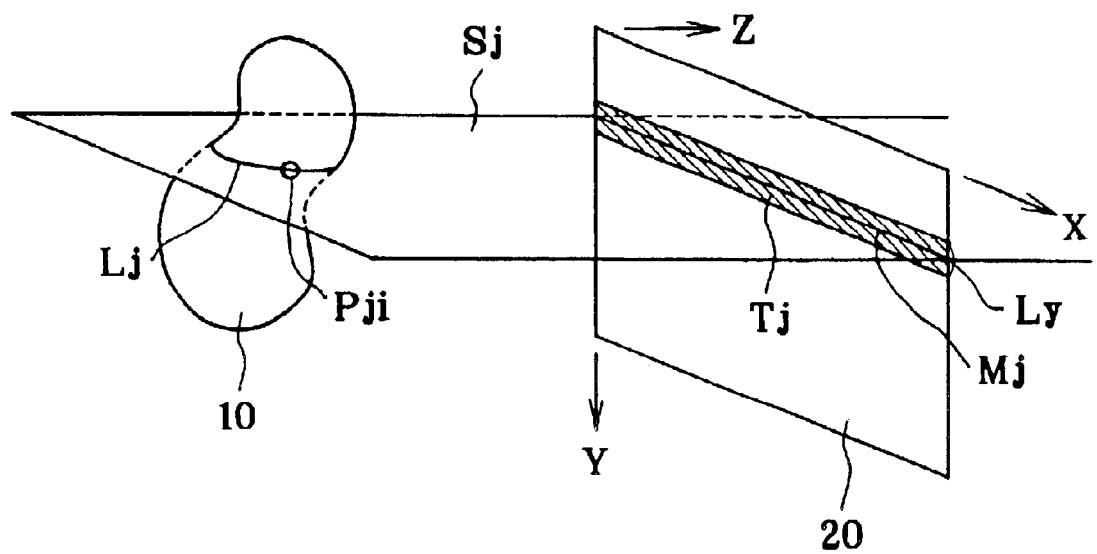
FIG. 8 is a perspective schematic illustrative of the relationships between a sample light source defined on an original image 10 and a strip area defined on a recording surface 20.

FIG. 8 is a perspective schematic illustrative of what relation a sample light source Pji defined on an original image 10 has to a strip area Tj defined on a recording surface 20. Here, the sample light source Pji is an i-th sample light source out of a multiplicity of sample light sources located at a given spacing d on a j-th sectional line Lj defined by cutting the original image 10 by a j-th section Sj. The strip area Tj is a rectangular area (hatched in FIG. 8) defined by allowing a line of intersection Mj of the j-th section Sj with the recording surface 20 to have a width Ly (Ly=D) in the Y-axis direction. Here, if the angle of spreading of object light emitted from the sample light source Pji in the Y-axis direction is limited to a given angle θy as mentioned above, this object light will reach only within the strip area Tj. Although not shown in FIG. 8, a multiplicity of sample light sources inclusive of the sample light source Pji are defined on the sectional line Lj. Here, if a specific condition is set in such a way that object light beams emitted from all sample light sources defined on the sectional line Lj reach only within the strip area Tj, loads on the computation of the intensity of interference waves can then be largely lifted up. That is, what is necessary for performing computations on computation points within the j-th strip area Tj is only to give consideration to object light coming from sample light sources defined on the j-th sectional line Lj.

Thus, when computations are performed with a limited angle of spreading of object light, an interference fringe pattern obtained on the recording surface 20 does not provide an intrinsic hologram pattern, resulting in a failure in obtaining a correct 3D reconstructed image. For instance, when a hologram is fabricated while the angle of spreading of object light in the Y-axis direction is limited as shown typically in FIGS. 7 and 8, a reconstructed image obtained from such a hologram ensures an adequate 3D appearance with respect to the X-axis (lateral) direction, but does not apply any adequate 3D appearance with respect to the Y-axis (longitudinal) direction. Consequently, when the hologram is observed from above or below in an oblique direction, any correct reconstructed image cannot often be obtained. In actual applications such as anti-counterfeiting seals, however, even that hologram offers no practically grave problem, because of being capable of reproducing a reconstructed image ensuring some three-dimensional appearance when observed from a general direction of viewing.

Figure 9:
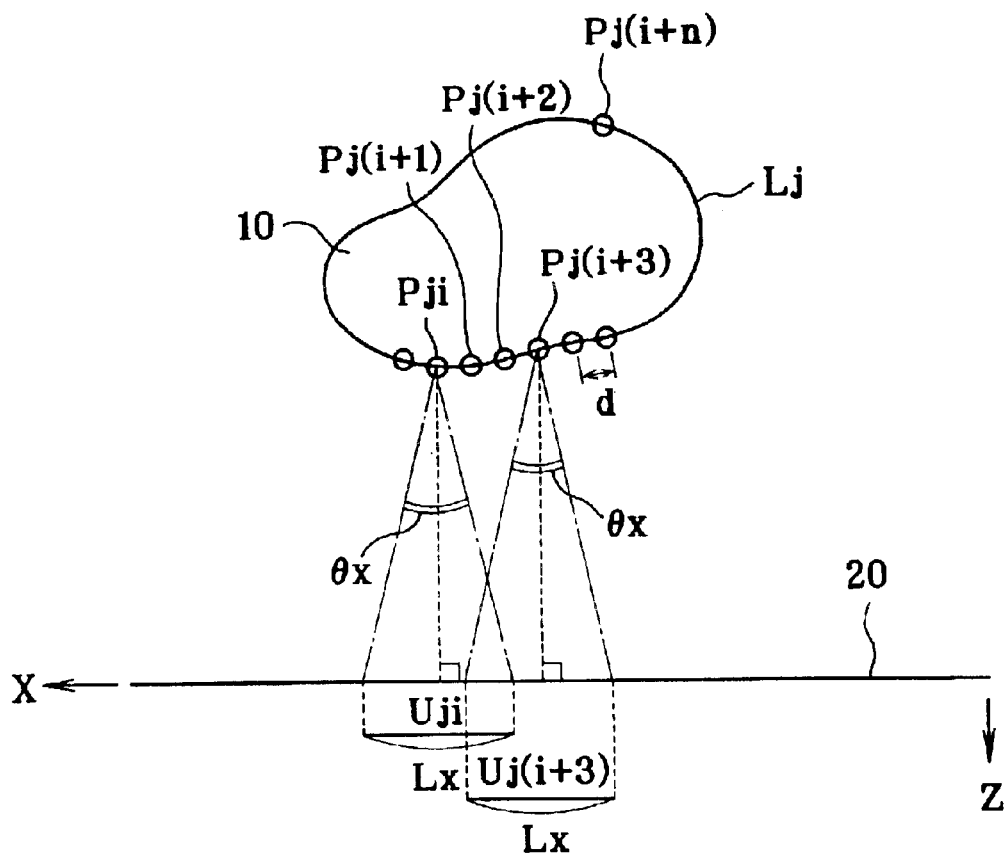
FIG. 9 is a top view illustrative of how object light behaves when both the angle of spreading in the X-axis direction and the angle of spreading in the Y-axis direction are limited.

How to limit the angle of spreading, θy, of object light in the Y-axis direction has been explained. In general applications of the present invention, however, it is preferable that the angle of spreading, θx, of object light in the X-axis direction, too, is limited in such a way that object light from one sample light source Pi reaches only within an Ly by Lx unit area Ui, as shown in FIG. 4. FIG. 9 is a top view illustrative of how object light behaves when both the angles of spreading in the X-axis and Y-axis directions are limited. On a sectional line Lj obtained by cutting an original image 10 by a j-th section Sj there are defined a multiplicity of sample light sources at a given spacing d, as shown in FIG. 9. Here, if the angle of spreading of object light in the X-axis direction is limited to an angle θx, object light from an i-th sample light source Pji will reach only within a unit area Uji on a recording surface 20 and object light from a (i+3)-th sample light source Pj(i+3) will reach only within a unit area Uj(i+3) on the recording surface 20. Likewise, object light from a (i+1)-th sample light source Pj(i+1) will reach only within a unit area Uj(i+1) on the recording surface 20 and object light from a (i+2)-th sample light source Pj(i+2) will reach only within a unit area Uj(i+2) on the recording surface 20, although not shown in FIG. 9. In this way, the unit areas Uji, Uj(i+1), Uj(i+2) and Uj(i+3) are slightly displaced while they overlap. It is here noted that object light from a (i+n)-th sample light source Pj(i+n) defined on the back side of an original image 10 will not practically arrive at the recording surface 20 unless the original image 10 is a transparent object; however, the angle of spreading may be defined in the same manner.

Figure 10:
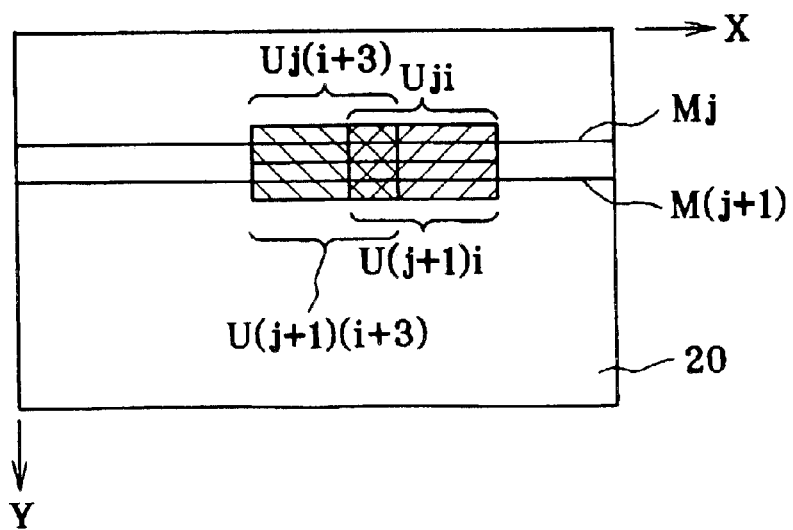
FIG. 10 is a front view of the recording surface 20 of FIG. 9 as viewed from the original image 10 side.

FIG. 10 is a front view of the recording surface 20 of FIG. 9 as viewed from the original image 10 side. There are unit areas Uji and Uj(i+3) positioned on a line of intersection Mj, at which, as shown in FIG. 9, object light beams from sample light sources Pji and Pj(i+3) on the sectional line Lj arrive, as well as unit areas U(j+1)i and U(j+1)(i+3) positioned on a line of intersection M(j+1), at which object light beams from sample light sources P(j+1)i and P(j+1)(i+3) that go down by a given spacing D arrive. It is understood that on the recording surface 20 there are defined a multiplicity of unit areas that are not shown in FIG. 9, and that these unit areas overlap. Then, a specific unit area on the recording surface 20 corresponds to a specific sample light source on the original image 10. For instance, the unit area Uji on the recording surface 20 corresponds to the specific sample light source Pji on the original image 10.

When both the angles of spreading in the X-axis and Y-axis directions are limited, the computations may be performed as follows. When computing the intensity of interference waves with respect to a certain one computation point on the recording surface 20, it is first required to identify some unit areas inclusive of said computation point. Then, the intensity of interference waves should be computed while only object light beams from sample light sources corresponding to these unit areas are taken into account.

Figure 11:
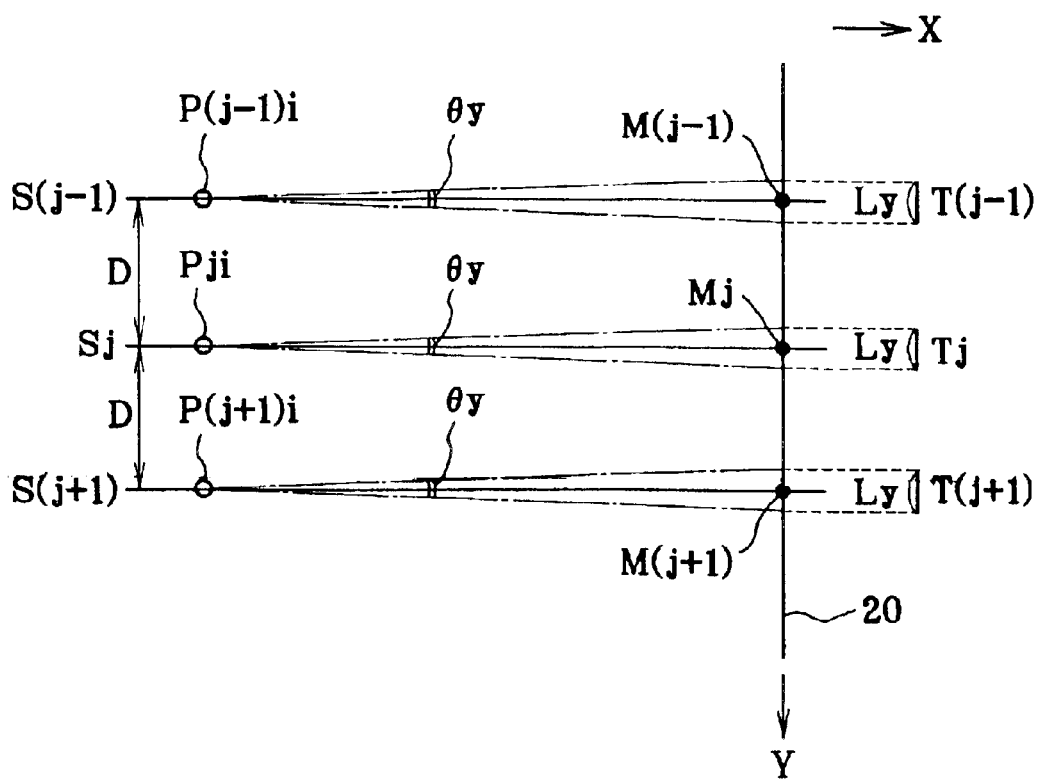
FIG. 11 is a side view illustrative of how object light arrives at a recording surface 20 when the angle of spreading $\theta y$ shown in FIG. 7 is set at a smaller value.

In the embodiments that have so far been explained, the width Ly of the strip area in the Y-axis direction (or the width of the unit area in the Y-axis direction) is made equal to the section-to-section spacing D, whereby the recording surface 20 is thoroughly filled up with a multiplicity of strip areas located in the Y-axis direction. However, the width Ly of the strip area may be made smaller than the section-to-section spacing D. In this case, on the recording surface 20 there are void areas with no strip areas defined thereon. FIG. 11 is a side schematic illustrative of how object light propagates when the angle of spreading θY shown in FIG. 7 is set at a smaller angle. In FIG. 11, too, strip areas T(j−1), Tj and T(j+1) are defined on a recording surface 20 as is the case with FIG. 7, and on computation points within these strip areas, the intensity values of given interference waves are computed. However, there are void areas between adjacent strip areas, because the width Ly of each strip area is made smaller than the section-to-section spacing D (in FIG. 11, Ly=D/4). Any object light from sample light sources on an original image 10 does not arrive at those void areas on the recording surface 20, and as a matter of course, the intensity values of interference waves are not obtained. Therefore, for the void areas occurring on the recording surface 20, the results of computations of the intensity of interference waves with respect to the adjacent strip areas should be used by copying.

Figure 12:
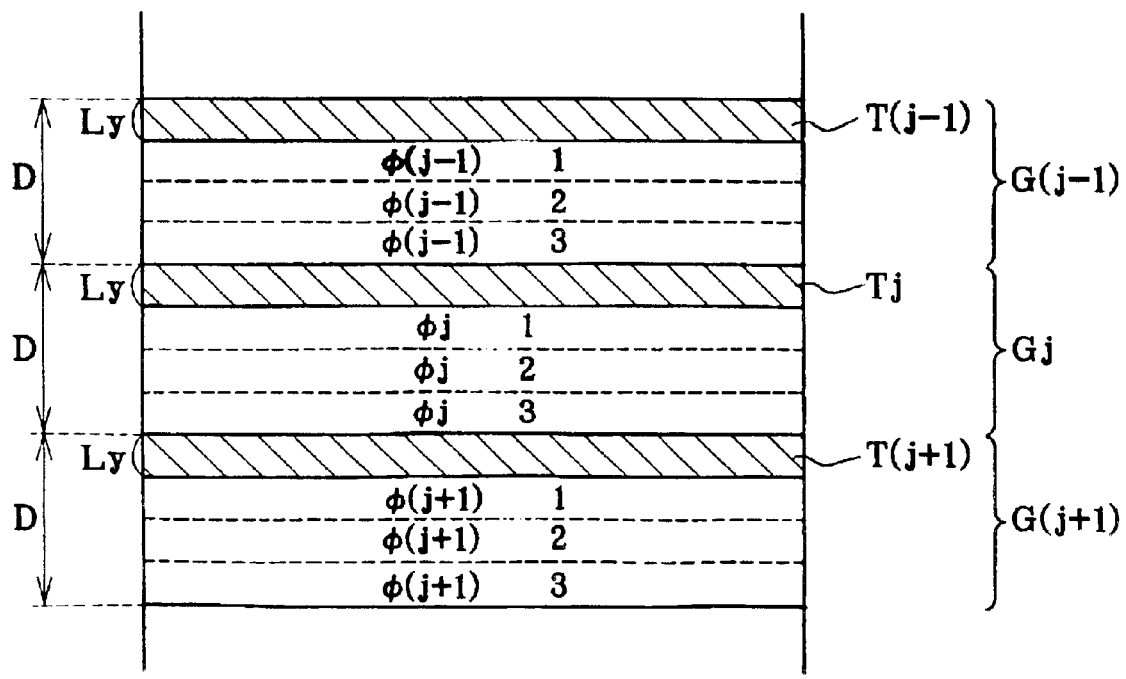
FIG. 12 is a plan view of the recording surface 20 of FIG. 11, explaining the principles of copying the results of computation on a strip area to a void area.

FIG. 12 is a plan view of the recording surface 20 for explaining the principles of copying the results of computations with respect to strip areas to void areas. Strip areas T(j−1), Tj and T(j+1) are represented by hatched areas, and void areas between adjacent strip areas are represented by broken-line areas. The intensity values of interference waves are found on computation points distributed in each strip area; however, no results of computations are obtained with respect to the void areas at all. In FIG. 12, the results of computation obtained with respect to the interior of the strip area T(j−1) for instance are copied to three void areas φ(j−1)1, φ(j−1)2 and φ(j−1)3, the results of computation found with respect to the interior of the strip area Tj are copied to three void areas φj1, φj2 and φj3, and the results of computation obtained with respect to the interior of the strip area T(j+1) are copied to three void areas φ(j+1)1, φ(j+1)2 and φ(j+1)3. By doing so, it is possible to find the results of computations of interference wave intensities on the whole recording surface 20.

Given such copying, each of the areas indicated by groups G(j−1), Gj and G(j+1) in FIG. 12 may be regarded as an area where four strip areas having the same interference fringes recorded therein are located in a continuously repetitive fashion. It is understood that the hologram fabricated by such copying is not an intrinsic hologram, and so any intrinsic 3D reconstructed image is not obtained; however, this hologram has the merit of dispensing with computations on the void areas, resulting in substantial reductions in loads on general computations.

§4. Fundamental Concept of the Invention

The precondition common to all the embodiments so far set forth in §1 through §3 is that a single original image 10 is recorded on the recording surface 20. By contrast, the precondition for the present invention is that a plurality of original images are recorded on the recording surface 20, and the object of the present invention is to enable a plurality of original images to be viewed with the master-slave relations as intended.

Figure 13:
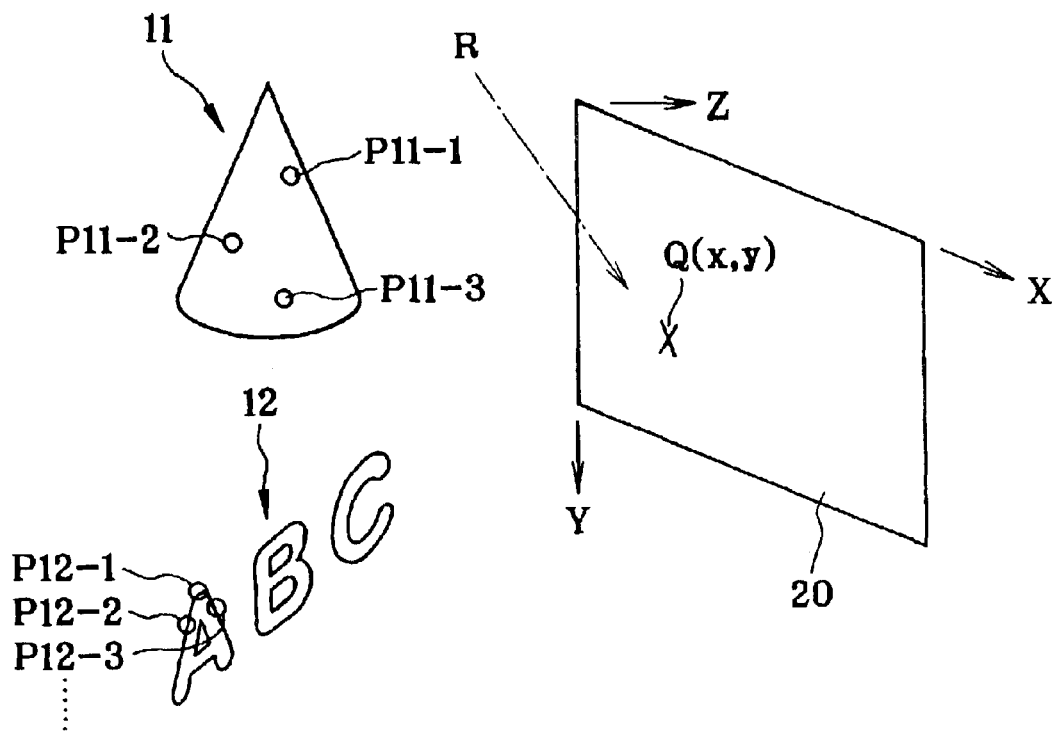
FIG. 13 is illustrative of the principles of how to recording a conical original image 11 and an original image 12 comprising character strings on a recording surface 20 using a computer-generated hologram methodology.

Consider here the case where two original images 11 and 12 located longitudinally as shown in FIG. 13 are recorded on a recording surface 20 using a computer-generated hologram methodology. In this case, the original image 11 is a 3D image of simple conical shape, and the original image 12 is a plane image comprising three characters of "ABC" (it is acceptable to use a 3D image of some thickness). As already set forth in §1, a multiplicity of sample light sources must be defined on the original images so as to perform computations for actual fabrication of a computer-generated hologram. For instance, FIG. 13 is illustrative of how sample light sources P11-1, P11-2 and P11-3 are defined on the original image 11 (much more sample light sources are needed for practical recording of the conical original image 11) as and how sample light sources P12-1, P12-2, P12-3, . . . are defined on the original image 12.

Consider now computations with no limitation imposed on the angle of spreading of object light emitted from each sample light source. On an arbitrary computation point Q(x, y) defined on the recording surface 20 shown in FIG. 13, the intensity value of interference waves of reference light R and object light emitted from all sample light sources (except a hidden surface) defined on the two original images 11 and 12 will be computed. On the other hand, if limitation is placed on the angle of spreading of each object light as set forth in §2, object light from the upper original image 11 will reach only within a trapezoid recording area α11 located at an upper position of the recording surface 20 and object light from the lower original image 12 will reach only within an elliptic recording area α12 located at a lower position of the recording surface 20, as shown typically in FIG. 14. Thus, the recording area α11 corresponding to the original image 11 is defined as an assembly of spots formed on the recording surface 20 by spotlights of object light from a number of sample light sources P11-1, P11-2, P11-3, . . . defined on the original image 11. Likewise, the recording area α12 corresponding to the original image 12 is defined as an assembly of spots formed on the recording surface 20 by spotlights of object light from a number of sample light sources P12-1, P12-2, P12-3, . . . defined on the original image 12.

After all, only information about the upper original image 11 is recorded in the recording area α11 on the recording surface 20 and only information about the lower original image 12 is recorded in the recording area α12, whereas the information about the original images is not recorded whatsoever in other areas on the recording surface 20. Thus, with some limitations imposed on the angle pf spreading, no complete 3D reconstructed image is obtainable from the hologram pattern obtained on the recording surface 20, as already explained. For instance, the field angle of viewing becomes narrow, and so when the recording surface 20 is observed at an acute angle from above or below, the two original images 11 and 12 are not correctly reconstructed. However, this does not offer a practically grave problem, because for the purpose of fabricating a hologram-recorded medium used for anti-counterfeiting, it is not always required to ensure a perfect 3D reconstructed image.

Figure 14:
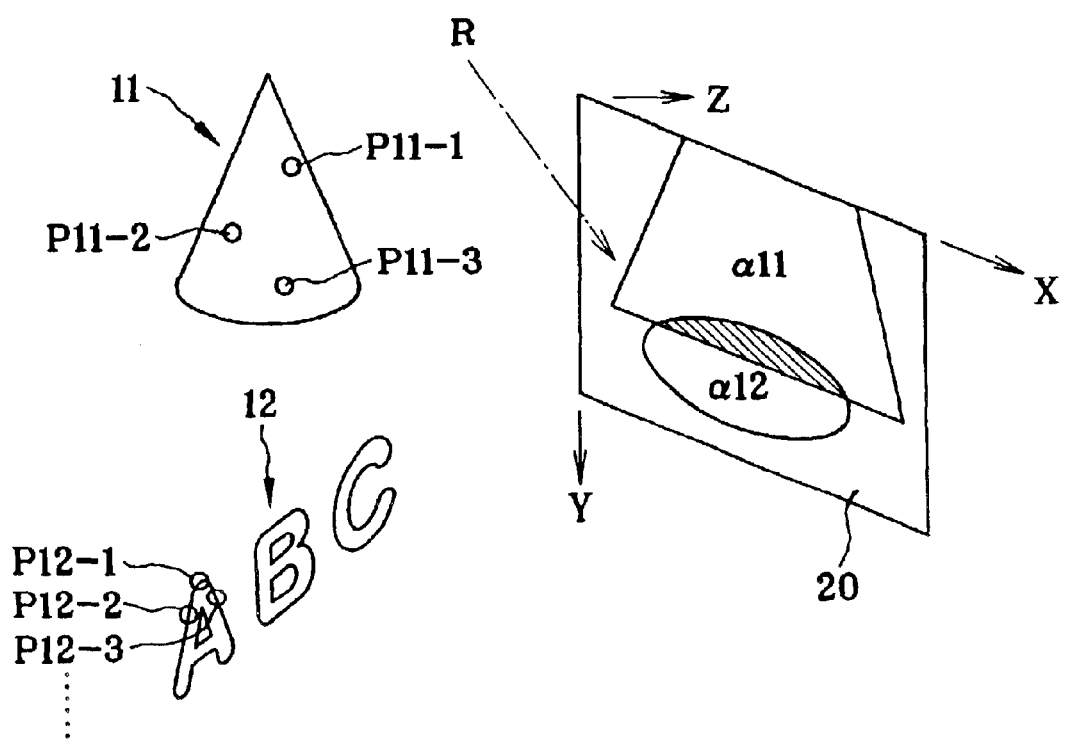
FIG. 14 is illustrative of one example of recording areas $\alpha 11$ and $\alpha 12$ corresponding to individual original images 11 and 12 defined on a recording surface 20.

With the method of cutting each original image by a multiplicity of sections parallel with the XZ plane and defining sample light sources at a given pitch on the resulting sectional line as discussed in §3, an area, at which object light from one sample light source Pji formed on the recording surface arrive, is given by a rectangular unit area Uji, as shown in FIG. 10. Accordingly, the recording area α11 corresponding to such a conical original image 11 as shown in FIG. 14 takes a trapezoid shape as shown. On the other hand, the recording area α12 corresponding to the original image 12 comprising a character string of "ABC" becomes an area configured such that the overall outline of the character string is slightly dilated (for the sake of convenience, that area is drawn as an elliptical area in FIG. 14).

In this connection, it is not always required to set the angle of spreading in terms of angle. As shown typically in FIG. 4, the angle of spreading is defined such that object light emitted from the sample light source Pi spreads by θx in the X-axis (horizontal) direction and by θy in the Y-axis (vertical) direction with the center on a perpendicular that goes from the sample light source Pi down to a plane including the recording surface 20. It is understood that not only may the angles of spreading be set by fixing such angles θx and θy at given values, but they may also be set by determining the size Lx in the X-axis direction and the size Ly in the Y-axis direction of the unit area Ui (hatched in FIG. 4) formed on the recording surface 20. When the angles of spreading are directly set by the angles θx and θy, the sizes Lx and Ly of the unit area Ui formed on the recording surface 20 vary with the distance between the sample light source Pi and the recording surface 20. Conversely, when the angles of spreading are indirectly set by the sizes Lx and Ly of the unit area Ui formed on the recording surface 20, the actual angles of spreading, θx and θy, of object light emitted from the sample light source Pi vary depending on the distance between the sample light source Pi and the recording surface 20. Of course, it is acceptable to define the angle of spreading in the X-axis direction directly with the given angle θx and the angle of spreading in the Y-axis direction indirectly with the width Ly in the Y-axis direction of the unit area Ui formed on the recording surface 20.

As shown typically in FIG. 14, the rough positions and shapes of the recording areas α11 and α12 corresponding to the original images 11 and 12 are commensurate with those of the original images 11 and 12; however, the more precise positions and shapes are governed by the conditions set for the angles of spreading. Namely, the larger the set angles of spreading, the larger the areas of the recording regions become. Accordingly, when the original images 11 and 12 are located proximately to some extents or the angles of spreading are set at somewhat larger values, the recording areas α11 and α12 overlap each other as hatched in FIG. 14. Referring especially to a plurality of original images located at positions where projected images overlap one another upon projection onto the recording surface 20 in the vertical direction thereto, the recording areas corresponding to individual original images overlap one another.

The rudimentary concept of the present invention is that when recording areas corresponding to a plurality of original images overlap one another, priorities are assigned to these recording areas so that a recording area having higher priority takes precedence over the rest with respect to an overlapping portion to eliminate the overlapping portion, whereby one recording area is recorded with information carried by object light emitted from a multiplicity of sample light sources that form one original image to be recorded. Referring typically to the embodiment shown in FIG. 14, when the angles of spreading are set under given conditions for the original images 11 and 12, the recording areas α11 and α12 overlap each other at the hatched portion. Here, if higher priority is assigned to the recording area α11 than to the recording area α12 (which means that the original image 11 takes precedence over the original image 12), the hatched area represents an area to which the recording area α11 is assigned. Thus, only information about the original image 11 is recorded in that area; information about the original image 12 is not recorded in that area at all.

While the present invention has been described with reference to two original images, it is understood that the present invention is generally applicable to the fabrication of computer-generated holograms using 2 to K original images. The process for the fabrication of a computer-generated hologram according to the present invention is carried out through the following steps. First of all, 2 to K original images, a recording surface for recording the original images and reference light with which the recording surface is irradiated and which corresponds to these original images are defined. Then, a multiplicity of sample light sources are defined on each original image. Specifically, the sample light sources should be defined by the definition method using sections, as discussed in §3. Subsequently, the given angles of spreading of object light beams emitted from individual sample light sources are defined. As already explained, the angles of spreading may be defined in terms of either angle or the size of an area formed on the recording surface 20, at which object light arrives. The angles of spreading may also be varied for each original image or for each sample light source on the same original image. To lift up loads on computations, however, it is preferable to set the angles of spreading under the same conditions whenever possible.

Then, an area on the recording surface 20, at which object light emitted from all sample light sources defined on one original image with the given limited angles of spreading, is determined as a recording area corresponding to one original image, whereby recording areas corresponding to the respective K original images are defined. Referring typically to FIG. 14, the recording area $\alpha 11$ corresponding to the original image 11 and the recording area $\alpha 12$ corresponding to the original image 12 are defined. Here, when a plurality of recording areas overlap each other on the recording surface 20, priorities are assigned to these recording areas, so that a recording area having higher priority takes precedence over the rest with respect to an overlapping portion to eliminate the overlapping portion. Referring again to FIG. 14, if the recording area $\alpha 11$ takes precedence over the recording area $\alpha 12$, the hatched overlapping area will be incorporated in a part of the recording area $\alpha 11$ and subtracted from the recording area $\alpha 12$.

Subsequently, a multiplicity of computation points are defined on the recording surface 20. On each computation point, the intensity of interference waves formed by reference light R and object light emitted from a sample light source on an original image corresponding to a recording area to which said computation point is allocated and from which the overlapping portion has been eliminated is found by computation, so that interference fringes comprising a distribution of the intensity of interference waves found on each computation point are formed on the recording surface as holograms for the K original image. Referring to the aforesaid embodiment, on computation points within the recording area $\alpha 11$ the intensity of interference waves formed by reference light R and object light emitted from sample light sources on the original image 11 is computed, and on computation points within the recording area $\alpha 12$ the intensity of interference waves formed by reference light R and object light emitted from sample light sources on the original image 12 is computed.

The concept behind the present invention is that when a hologram is fabricated for 2 to K original images through such steps as explained above, it can be observed while the K original images have specific master-slave relations. The wording "master-slave relations" used herein is understood to mean that the master original image can be observed in contrast to or in more enhanced states than the slave original image. At the junction of the master and slave original images in particular, the outline of the master original image is much more enhanced.

Referring typically to FIG. 14, if higher priority is assigned to the recording area $\alpha 11$, information about the original image 11 will be recorded in the overlapping region shown by hatches in FIG. 14. Accordingly, when the hologram recorded on the recording surface 20 is reconstructed, the outline of the bottom of the original image 11 will be more enhanced and at this outline region the original image 11 will be observed in contrast to the original image 12. Conversely, if higher priority is assigned to the recording area $\alpha 12$, information about the original image 12 will be recorded in the overlapping region shown by hatches in FIG. 14. Accordingly, when the hologram recorded on the recording surface 20 is reconstructed, the outline of the upper side of the original image 12 will be enhanced and at this outline region, the original image 12 will be observed in contrast to the original image 11. Thus, if a hologram is fabricated with certain master-slave relations to a plurality of original images, it is then possible to fabricate a hologram-recorded medium that can be observed with the master-slave relations as intended.

Figure 15:
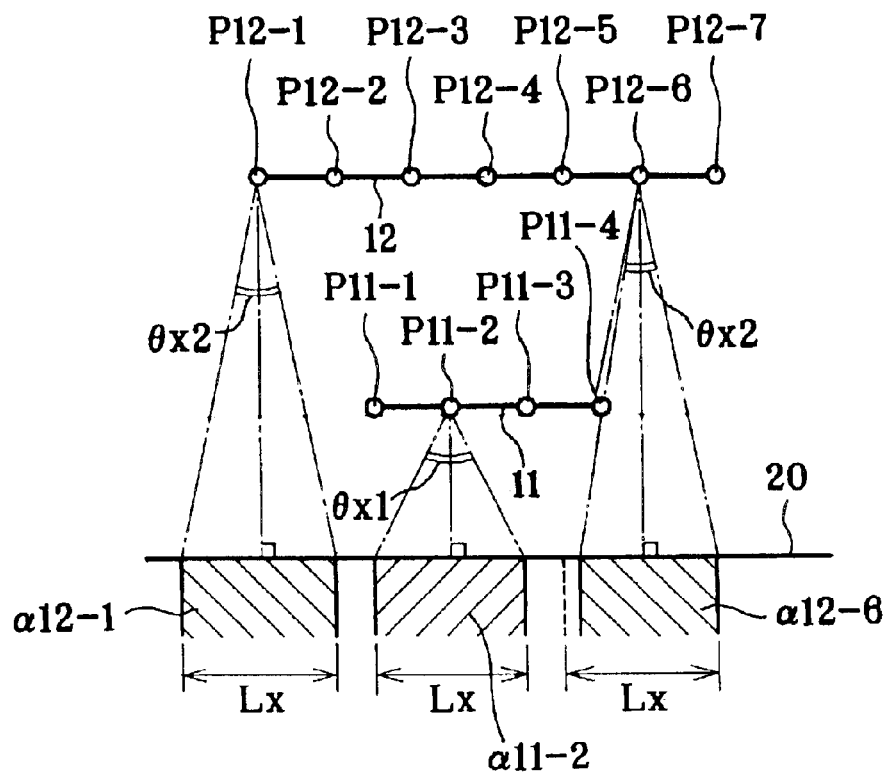
FIG. 15 is a top view illustrative of what position relations two original images 11 and 12 have to a recording surface 20, illustrating the basic principles of the present invention.

The basic concept of the present invention has been explained with reference to the embodiment shown in FIG. 14. In what follows, this basic concept will be explained in a little more detail. In FIG. 14, two original images 11 and 12 are located at upper and lower positions. Consider here original images located before or after the recording surface 20. FIG. 15 is a top view of the first original image 11 located in the rear of the recording surface 20 and the second image 12 located in the rear of the first original image 11. For convenience of explanation, assume here that the original images 11 and 12 are each a planar object parallel with the recording surface 20, and sample (point) light sources are defined at a given spacing as shown. Specifically, sample light sources P11-1 to P11-4 are defined for the original image 11, and sample light sources P12-1 to P12-7 are defined for the original image 12. The present invention is very effective for the case where for a plurality of original images located at positions where projected images overlaps each other upon projection onto the recording surface 20 in the vertical direction thereto, a hologram is recorded with master-slave relations.

Once the sample light sources have been defined as shown in FIG. 15, it is necessary to set the angles of spreading of object light emitted from these sample light sources. For convenience of explanation, let us give consideration to only the angle of spreading of object light in the lateral (X-axis) direction. Consider now that the angle of spreading in the lateral direction is defined by the size value Lx in the lateral direction of a unit area on the recording surface 20, at which the object light arrives. For instance, object light emitted from the sample light source P11-2 on the original image 11 spreads by angles $\theta x1$ with the center on a perpendicular that goes from the sample light source P11-2 down to the recording surface 20 as shown, and eventually reaches within an area $\alpha 11$-2 on the recording area 20, as shown by hatches in FIG. 15. At this time, the angles $\theta x1$ are determined such that the lateral size of the area $\alpha 11$-2 becomes the given set value Lx. Likewise, object light emitted from the sample light source P12-1 on the original image 12 spreads by angles $\theta x2$ with the center on a perpendicular that goes from the sample light source P12-1 down to the recording surface 20 as shown, and eventually reaches within an area $\alpha 12$-1 on the recording area 20, as shown by hatches in FIG. 15. At this time, the angles $\theta x2$ are determined such that the lateral size of the area $\alpha 12$-1 becomes the given set value Lx. In this embodiment, the lateral sizes of the areas $\alpha 11$-2 and $\alpha 12$-1 each become the given set value Lx; $\theta x1 > \theta x2$ in terms of angle.

It is noted that object light emitted from the sample light source P12-6 on the original image 12 propagates with such angles of spreading that it spreads by angles $\theta x2$ with the center on a perpendicular that goes from the sample light source P12-6 down to the recording surface 20 and eventually arrives at an area on the recording surface 20, said area having a lateral size Lx; however, a portion of the object light is practically shielded by the right end portion of the original image 11, not arriving at the recording surface 20. The lateral width of an area $\alpha 12$-6 shown by hatches is shorter than the given set value Lx for the reason that a part of the left side thereof is subjected to the influence of shielding. Thus, the size value Lx utilized for the indirect setting of the angle of spreading is the size value of a unit area on the recording surface 20, at which the object light is expected to arrive, and that size is substantially indicative of the angle of spreading of object light radiated from a sample light source, not the size of an area on the recording surface 20, at which the object light practically arrives.

Figure 16:
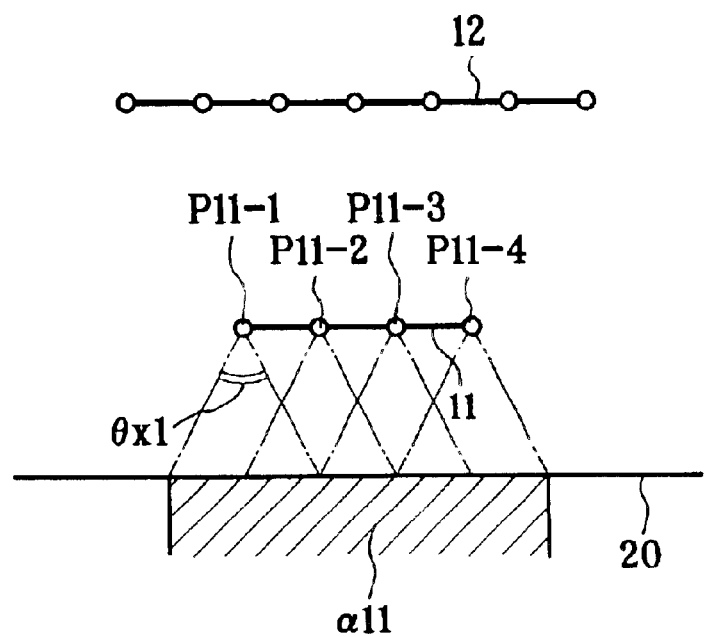
FIG. 16 is a top view illustrative of the recording area $\alpha 11$ on the recording surface 20 corresponding to the original image 11.
Figure 17:
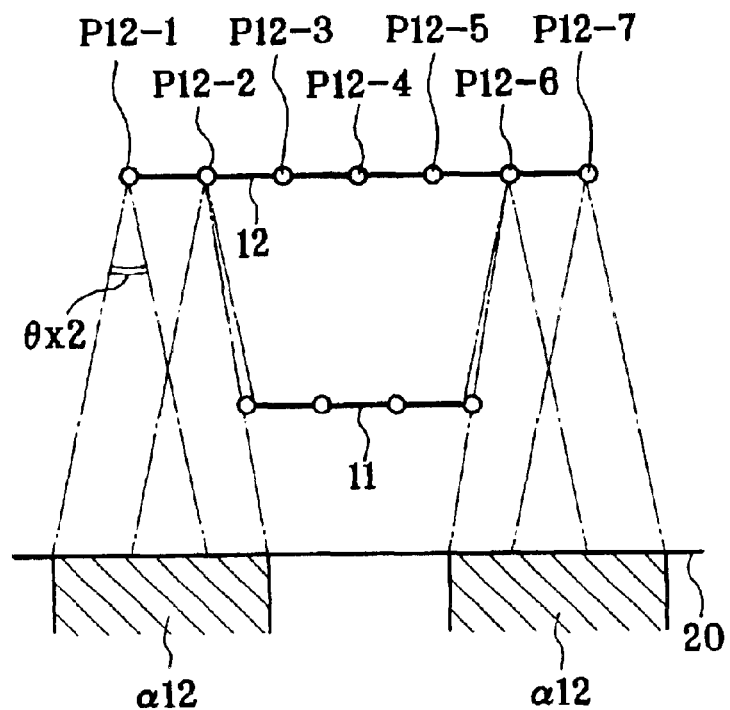
FIG. 17 is a top view illustrative of the recording area $\alpha 12$ on the recording surface 20 corresponding to the original image 12.

In summary, the recording area α11 corresponding to the first original image 11 is given by a portion hatched in FIG. 16, and the recording area α12 corresponding to the second original image 12 is given by a portion hatched in FIG. 17. It is understood that when the original image 11 is transparent, the area α12 shown in FIG. 17 includes a central void region.

As in the aforesaid embodiment, if the angle of spreading is indirectly set using the lateral size value Lx of the unit area on the recording surface 20, at which object light is expected to arrive, then the boundary position of the recording areas α11 and α12 can then be easily determined. For instance, the left-hand boundary position of the recording area α11 shown in FIG. 16 is spaced Lx/2 away from the foot of perpendicular in the left-hand direction, said perpendicular going from the sample light source P11-1 down to the recording surface 20, and the right-hand boundary position of the recording area α11 shown in FIG. 16 is spaced Lx/2 away from the foot of perpendicular in the right-hand direction, said perpendicular going from the sample light source P11-4 down to the recording surface 20. Accordingly, if the positions of individual sample light sources are represented by coordinate values on the XYZ three-dimensional coordinate system, the boundary position of each recording area can then be found by relatively simple computation. When the intensity value of interference waves is computed on an arbitrary computation point, it is also possible to identify which sample light source is to be considered by relatively simple computation.

Figure 18:
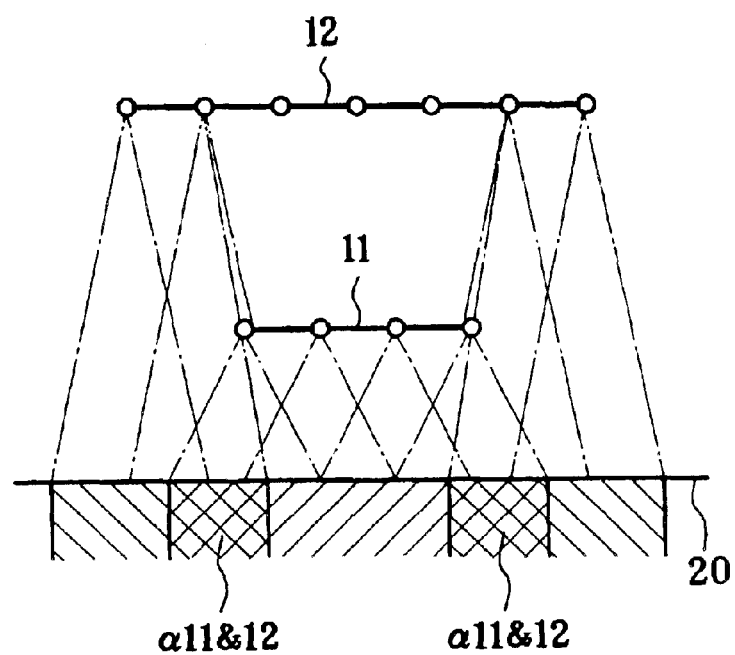
FIG. 18 is a top view illustrative of areas $\alpha 11 \& \alpha 12$ formed as a portion at which the recording area $\alpha 11$ shown in FIG. 16 overlaps the recording area $\alpha 12$ shown in FIG. 17.

Once the recording area α11 corresponding to the original image 11 has been found as shown in FIG. 16 and the recording area α12 corresponding to the original image 12 has been found as shown in FIG. 17, overlapping portions α11&α12 of these two recording areas are formed as shown in FIG. 18. Given the conditions for the aforesaid angle of spreading, the overlapping portions α11&α12 must, by definition, be recorded with information about both the original image 11 and the original image 12. In addition, there must be recorded much more information about the sample light source positioned at the boundary region of at least one of the original images. For instance, in the overlapping portions α11&α12 shown in FIG. 18 there should be recorded much more information about the sample light sources positioned at the right and left ends of the original image 11. The present inventor has found that by recording only information about the original image 11 in such overlapping portions it is possible to precede the original image 11 over the original image 12 upon representation and, conversely, by recording only information about the original image 12 in these overlapping portions it is possible to precede the original image 12 over the original image 11 upon representation.

Figure 19:
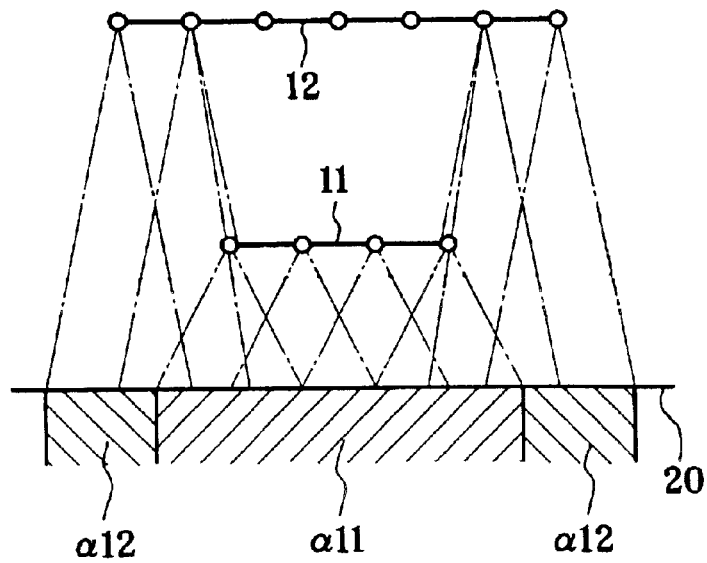
FIG. 19 is a top view illustrative of the recording areas $\alpha 11$ and $\alpha 12$ of FIG. 18 regulated by preceding the original image 11 located nearer to the position of viewing over the original image 12.

For instance, consider here the case wherein the position of viewing a reconstructed hologram image is pre-defined (the case where the recording surface 20 is viewed from the position of viewing predefined below the recording surface 20 shown in FIG. 18). If higher priority is assigned to the recording area α11 corresponding to the original image 11 located nearer to that position of viewing, the overlapping portions α11&α12 in FIG. 18 will be incorporated in the recording area α11 as shown in FIG. 19, and only information about the original image 11 will be recorded therein. This ensures that the boundary portion of the original image 11 is much more enhanced than the boundary portion of the original image 12, and so one can perceive that the foreground original image 11 represents a master motive and the original image 12 in the rear thereof takes a background image role. Such a method of representing the foreground original image 11 as a master image and the original image 12 in the rear thereof as a slave image is a general method that is reasonable to those skilled in the art.

Figure 20:
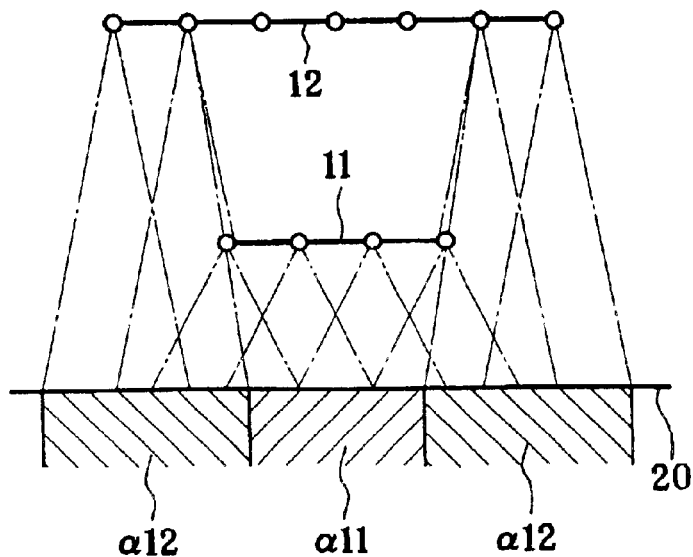
FIG. 20 is a top view illustrative of the recording areas $\alpha 11$ and $\alpha 12$ of FIG. 18 regulated by preceding the original image 12 located farther off the position of viewing over the original image 11.

When this master-slave setting is the other way around, special effects contrary to reason are achievable, and they may be useful for unconventional representations. That is, if higher priority is assigned to the recording area α12 corresponding to the original image 12 located far away from the position of viewing, the overlapping portions α11&α12 in FIG. 18 will be incorporated in the recording area α12 as shown in FIG. 20, and only information about the original image 12 will be recorded therein. This ensures that the boundary portion of the original image 12 is much more enhanced than the boundary portion of the original image 11, and so one can perceive that the foreground original image 11 represents a slave motive and the original image 12 in the rear thereof represents a master motive. Such a method of representing the foreground original image 11 as a slave image and the original image 12 in the rear thereof as a master image is a somewhat unreasonable one, but it is fully practical in that unique unconventional effects are achievable.

As already explained, reconstructing illumination environments for commercially exploited hologram-recorded media are usually far away from ideal. A problem with reconstruction of hologram-recorded holograms with a plurality of original images conventionally recorded thereon is that generally blurred, flat images are obtained, resulting in a failure in full representation of the master-slave relations intended for the respective original images. With the method of the present invention, such a problem with the master-slave relations can be overcome, and so it is possible to fabricate a computer-generated hologram that can be viewed with the master-slave relation as intended even when reconstructed in a daily illumination environment.

§5. More Specific Embodiments of the Invention

Finally, more specific embodiments of the present invention are explained. Consider here the case where such an original image 110 as depicted in FIG. 21(a) and nine original images 121–129 defined on an image plane 120 as shown in FIG. 21(b) are recorded on the same recording surface 20. The original image 110 used herein is a 3D image as is the case with the original image 11 shown in FIG. 13, and the original images 121–129 are each a plane image comprising a character string of "ABC" (that may be a character string of micro-characters having a maximum size of 300 μm or less), as is the case with the original image 12 shown in FIG. 13. Then, as shown in FIG. 22, the recording surface 20 is located on an XY plane (with the X-axis being vertical to the paper), the original image 110 is placed in the rear of the recording surface 20 (in the left-hand direction of the paper), and the image plane 120 with the original images 121–129 formed thereon is placed in a further rear thereof.

Figure 23:
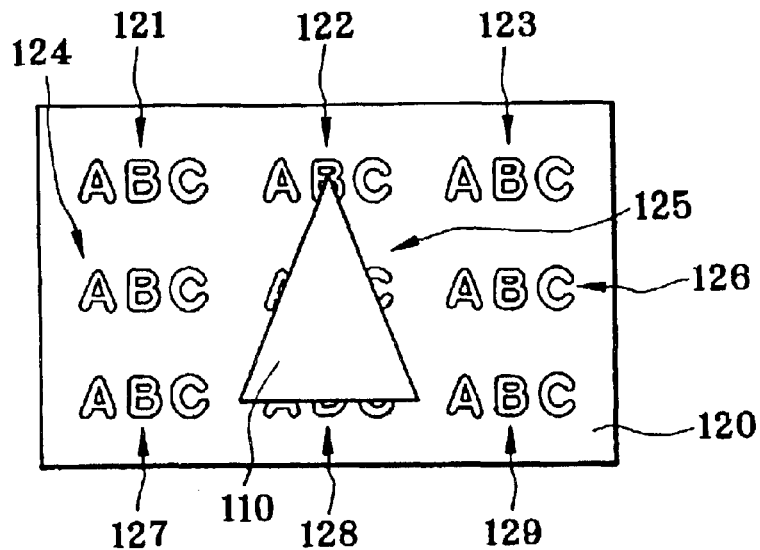
FIG. 23 is a front view of the location of the original images shown in FIG. 22, as viewed from the recording surface 20 side.

FIG. 23 is a front view of these original images as viewed from the recording surface 20 side. The conical original image 110 is located in front of the image plane 120, and the original images 121–129 formed on the image plane 120 and comprising character strings have a so-called background function in terms of design. When such original images that have been recorded on the recording surface 20 are reconstructed, the respective original images are observed in the same state as in FIG. 23. Of course, the reconstructed image to be observed is a hologram reconstructed image having a depth on a three-dimensional space, so that although depending on the angle of viewing, there is a change in the location of the original image 110 relative to the original images 121–129 that form the background.

Figure 24:
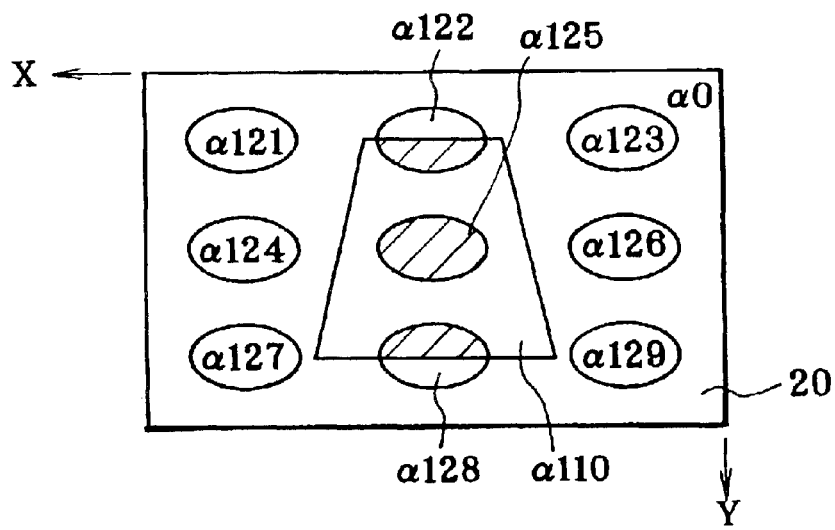
FIG. 24 is illustrative of recording areas defined on the recording surface 20 for recording the original images shown in FIG. 23.
Figure 25:
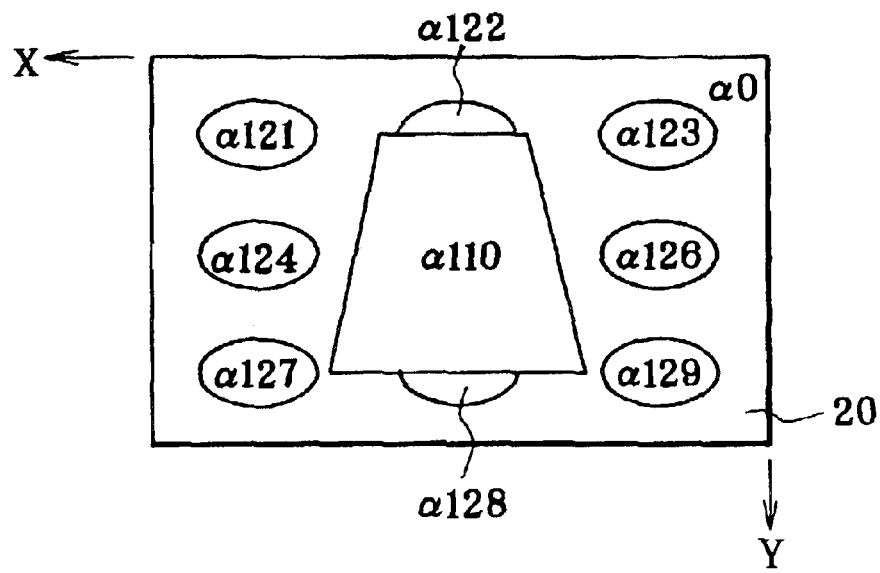
FIG. 25 is illustrative of how the original image 110 located nearer to the position of viewing is preceded over the rest, thereby eliminating overlapping portions of the recording areas shown in FIG. 24.

In the embodiment considered here, ten sets of original images 110 and 121–129 in all are recorded on the recording surface 20. For this reason, a multiplicity of sample light sources are defined on each original images, and the given angle of spreading is defined for object light emitted from individual sample light sources, whereupon individual recording areas α110 and α121–α129 are defined as areas at which object light emitted from all the sample light sources defined on one original image while the angle of spreading is limited arrive, as shown in FIG. 24. It is noted that an area α0 is an extra area that does not belong to any one of the recording areas. In these recording areas, however, there are overlapping portions (shown by hatches in FIG. 24). Here, priorities are assigned to the respective recording areas, so that a recording area having higher priority is preceded with respect to an overlapping portion (or the overlapping portion is incorporated in the recording area having higher priority), whereby the overlapping portion is eliminated. In the embodiment of FIG. 24, practically overlapping areas are α122 and α110, α125 and α110, and α128 and α110. If higher priority is assigned to the area α110 so as to precede the original image 110 located nearer to the position of viewing, the respective recording areas are placed in such states as shown in FIG. 25 upon elimination of the overlapping portions. The area α125, because of being fully superposed on the original image 110, vanishes upon elimination of the superposition.

Thus, in the embodiment shown in FIG. 25, nine recordings areas are defined, and in individual recording areas there is recorded only information about the respective original images. In other words, in each recording area there is recorded only information carried by object light emitted from sample light sources on the corresponding original image. For instance, on individual computation points defined within the recording area α121 the intensity value of interference waves of given reference light and the object light emitted from the sample light sources 121 is computed. It is noted that nowhere on the recording surface 20 is information about the original image 125 recorded, because the corresponding recording area vanishes.

When the interference fringe pattern recorded on the recording surface 20 by such a method as explained above is irradiated with given reconstructing illumination light, such an image as shown in FIG. 23 will basically be observed. However, any reconstructed image is not obtained for the original image 125 because it has not been recorded on the recording surface. The outline of the original image 110 is so enhanced that one can perceive an image that a conical form of master motive (the original image 110) is located in front of a background pattern comprising character strings (the original images 121–129).

Figure 26:
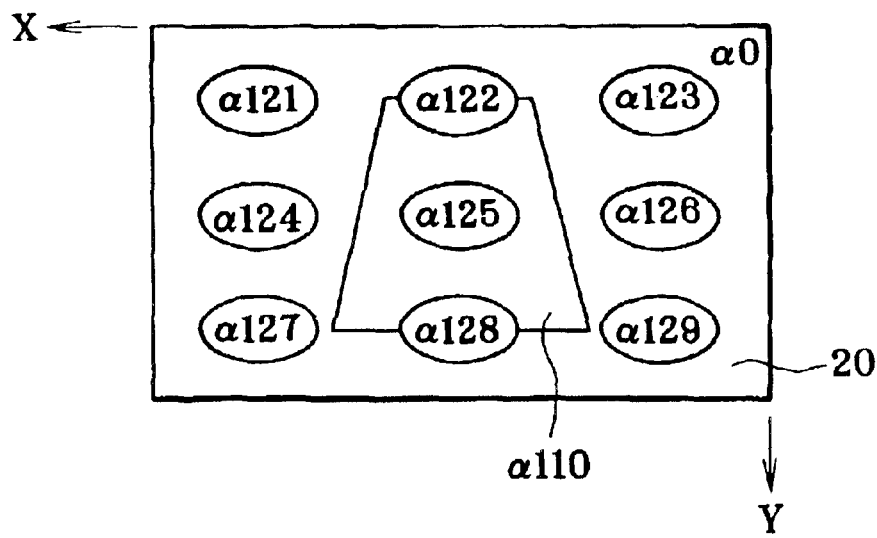
FIG. 26 is illustrative of how the original images 121–129 located farther off the position of viewing is preceded over the original image 110, thereby eliminating overlapping portions of the recording areas shown in FIG. 24.

Conversely, if higher priorities are assigned to the areas α121–α129 to precede the original images 121–129 located far away from the position of viewing over the original image 120, the respective recording areas are placed in such states as shown in FIG. 26 upon elimination of the overlapping portions. In this case, the whole recording area α125, too, remains as a recording area.

As the interference fringe pattern recorded in such recording areas as shown in FIG. 26, such an image as shown in FIG. 23 will basically be reconstructed. Regarding the conical original image 110, however, some portions are missing from the reconstructed image by virtue of missing information about the upper, middle and lower sections of the original image 110. Conversely, the outlines of the original images 122, 125 and 128 are so enhanced that one can perceive an image that in front of the master pattern comprising character strings (the original images 121–129) there is positioned the conical slave motive (the original image 110).

Figure 27:
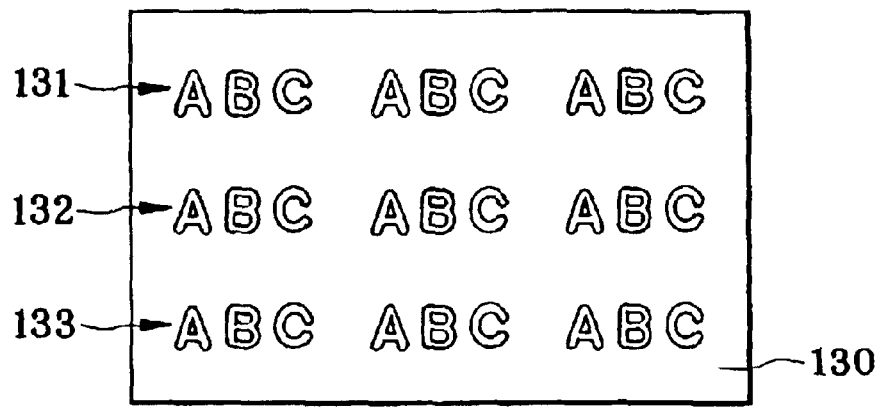
FIG. 27 is a front view illustrative of the original images of FIG. 21(b) that are grouped in another unit group.

In the aforesaid embodiment, the character string "ABC" is thought of as one original image, and the embodiment shown in FIG. 23 is described with reference to a total of 10 original images 110 and 121–129. However, the "one original image" used herein is an arbitrary definition; one single character may be thought of as one original image, and a character string group comprising a number of character strings may be regarded as one original image. For instance, FIG. 27 shows one example where character strings of "ABC" are arranged in three rows and three columns are thought of as one original image. This example may be dealt with on assumption that three original images 131, 132 and 133 are provided on an image plane 130.

Figure 28:
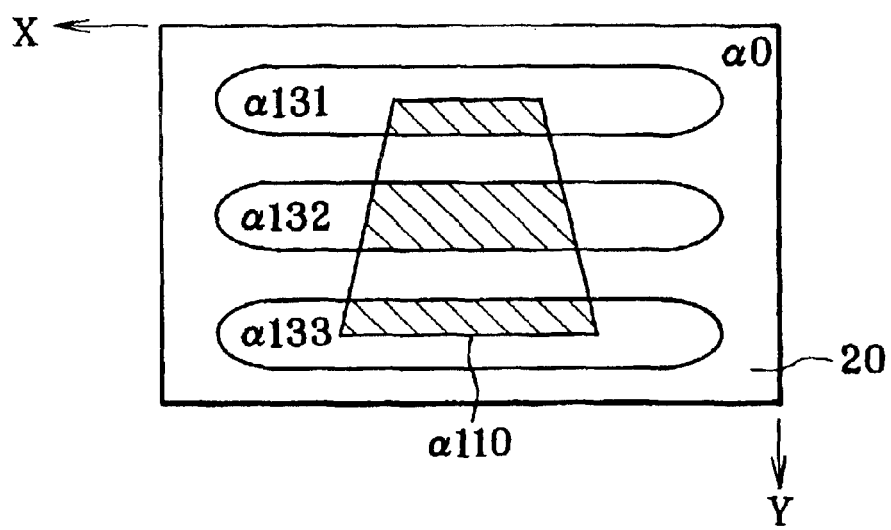
FIG. 28 is illustrative of recording areas defined on the recording surface 20 for recording the original images shown in FIG. 21(a) and FIG. 27.

When an image plane 130 having three original images 131, 132 and 133 is used in place of the image plane 120 of FIG. 23, a total of four original images 110, 131, 132 and 133 are defined, and corresponding to these original images there are defined such recording areas α110, α131, α132 and α133 as shown in FIG. 28. It is noted that an area α0 is an extra area that does not belong to any one of these recording areas. In these recording areas, there are again overlapping portions (shown by hatches in FIG. 28). Again, priorities are assigned to the respective recording areas, so that a recording area having higher priority is preceded over the rest with respect to an overlapping portion, thereby eliminating the overlapping portion.

Figure 29:
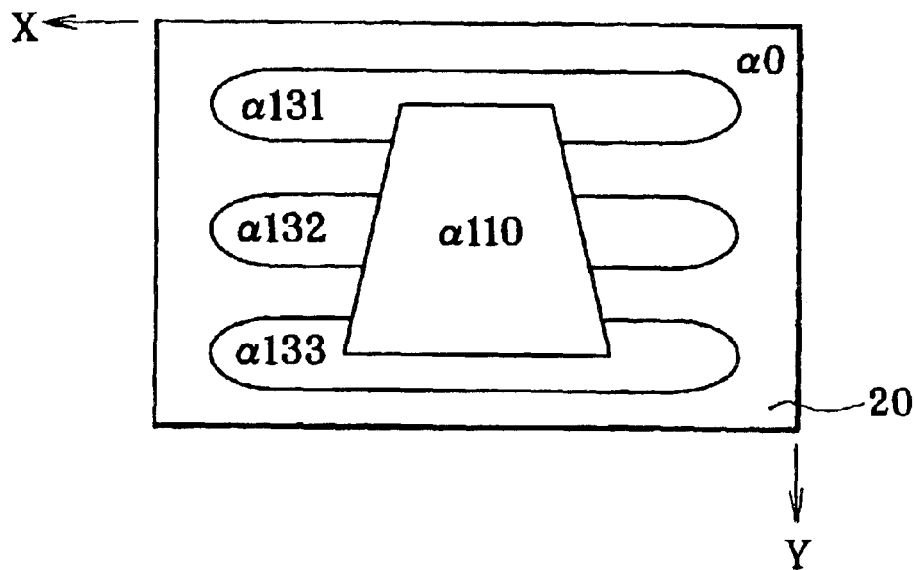
FIG. 29 is illustrative of how the original image 110 located nearer to the position of viewing is preceded over the rest, thereby eliminating overlapping portions of the recording areas shown in FIG. 28.
Figure 30:
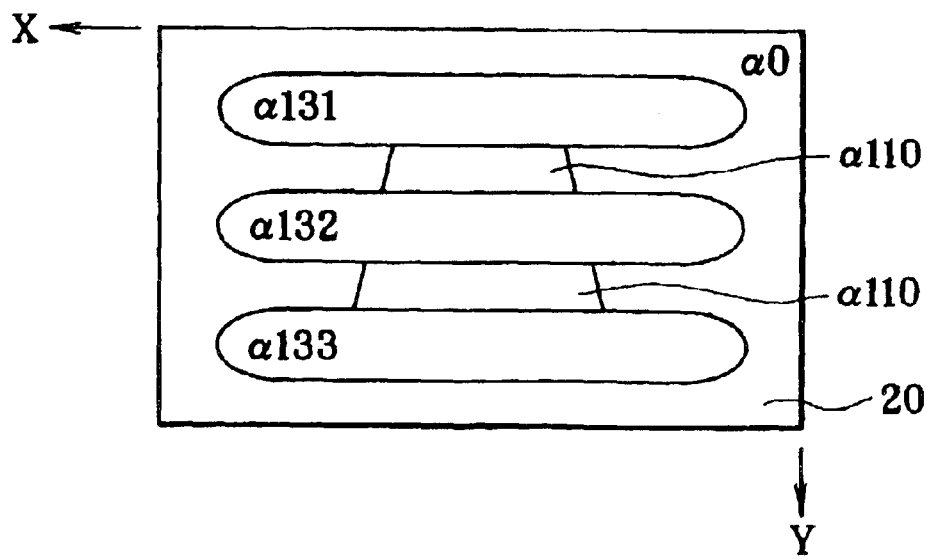
FIG. 30 is illustrative of how the original images 131–139 located farther off the position of viewing is preceded over the original image 110, thereby eliminating overlapping portions of the recording areas shown in FIG. 28.

For instance, if higher priority is assigned to the area α110 so as to precede the original image 110 located nearer to the position of viewing over the rest, the respective recording areas will be placed in such states as in FIG. 29 after elimination of the overlapping portions. Conversely, if higher priorities are assigned to the areas α131 to α133 so as to precede the original images 131–133 over the original image 110, the respective recording areas will be put in such states as shown in FIG. 30. As a hologram-recorded medium fabricated by the former method is reconstructed, there is obtained a reconstructed image with the original image 110 enhanced, and as a hologram-recorded medium fabricated by the latter method is reconstructed, there is obtained a reconstructed image wherein the original images 131–133 are enhanced. It is understood that even when three or more recording areas overlap one another, overlapping portions can be eliminated by preceding a recording area having the highest priority over the rest.

§6. Method of Recording Complex Amplitude Information

In the embodiments that have so far been set forth, information about original images is recorded on the recording surface 20 in the form of interference fringes of object light and reference light according to the basic principles shown in FIG. 1. With the computer-generated hologram methodology, however, it is not always necessary to record the original image 10 in the form of interference fringes using reference light R; object light from the original image 10 may be recorded as such directly on the recording surface 20. That is, when a hologram is optically fabricated, it is required to generate interference waves on a recording medium 20 comprising a photosensitive material over the constant time needed for photosensitization and record them as interference fringes. For this reason, it is required to generate interference waves that become stationary waves, utilizing reference light. With the computer-generated hologram methodology, however, a momentary state of waves existing on the recording surface 20 can be observed as if time were at a standstill, so that it can be recorded. To put it another way, the amplitude and phase (complex amplitude information) of object light on each computation point on the recording surface 20 at a given reference time can be found by computation. If the thus found complex amplitude information is recorded on the recording surface, it is then possible to record the original image 10 as an optical pattern. A typical example of the method of recording the complex amplitude information of object light emitted from the original image 10 is set forth in Japanese Patent Application No. 2000-265042, and the technical idea according to the present invention may be applied to such a complex amplitude information-recording method as well. The basic principles of recording this complex amplitude information are now briefly explained.

Figure 31:
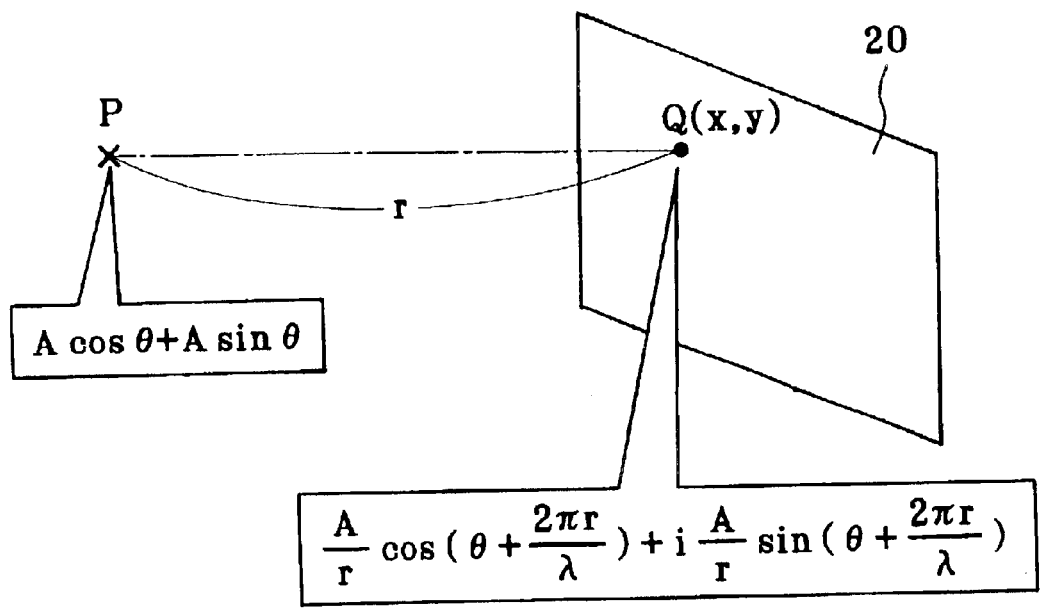
FIG. 31 is a perspective view illustrative of the amplitude and phase of object light arriving at a computation point Q(x, y) on a recording surface 20 in the case where a sample light source P and the recording surface 20 are defined.

Suppose now that a sample light source (point light source) P and a recording surface 20 are defined as shown in the perspective view of FIG. 31, and consider how the amplitude and phase of object light arriving at a computation point Q(x, y) on the recording surface 20 is computed. In consideration of amplitude and phase, wave motion is generally represented by the following complex function:

$$A \cos \theta + i A \sin \theta$$

where i is an imaginary unit, A is a parameter indicative of amplitude and θ is a parameter indicative of phase. If object light emitted from the point light source P is defined in terms of this complex function, then object light at the position of computation point Q(x, y) is given by the following complex function:

$$A/r \cos(\theta + 2\pi r/\lambda) + i A/r \sin(\theta + 2\pi r/\lambda)$$

where r is the distance between the point light source P and the computation point Q(x, y), and λ is the wavelength of object light. The amplitude of object light attenuates with increasing distance r, and the phase is determined depending on the distance r vs. wavelength λ relationship. This complex function has no variable indicative of time, because of being a function indicative of a momentary state of the wave observed when time is at a standstill at a given reference time.

Figure 32:
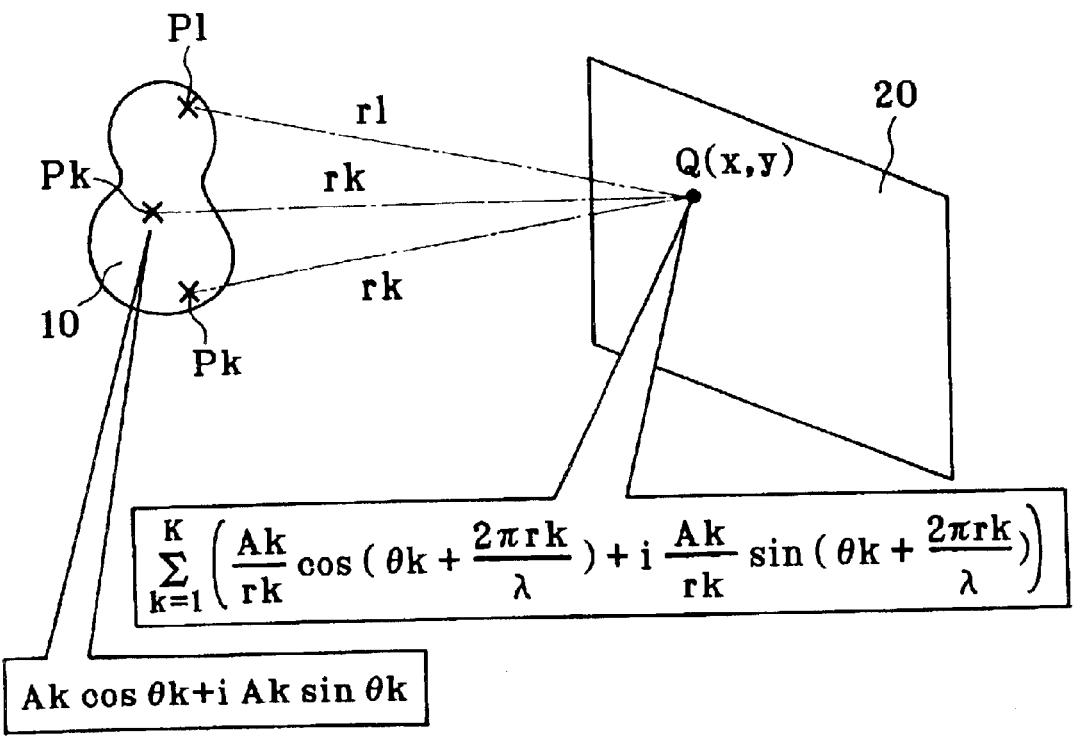
FIG. 32 is a perspective schematic illustrative of the complex amplitude of object light at the position of a computation point Q(x, y) in the case where object light emitted from each sample light source on an original image 10 arrives at the computation point Q(x, y) on a recording surface 20.

That is, to record information about the original image 10 on the recording surface 20, a multiplicity of sample light sources, i.e., point light sources P1, P2, . . . , Pk, PK should be defined on the original image 10 as shown in the perspective view of FIG. 32, and the amplitude and phase of the combined wave of object light emitted from each point light source are found by computation at the position of each computation point on the recording surface 20, followed by recording of them by some means. Suppose now that while a total of K point light sources are defined on the original image 10, object light emitted from a k-th point light source Pk is represented by such a complex function as shown in FIG. 32, i.e., $$Ak \cos \theta k + i Ak \sin \theta k$$

If the original image 10 is made up of a set of pixels each having a given gray-scale (concentration) value, the parameter Ak indicative of amplitude will be as a matter of course determined corresponding to the gray-scale value of the pixel existing at the position of the point light source Pk. It is generally acceptable that the phase θk is set at θk=0; if necessary, however, the phase may be set in such a way that object light of different phase is emitted from each part of the original image 10. Once object light represented by the aforesaid complex function has been defined with respect to all of K point light sources, the combined wave of a total of K object light beams at the position of any arbitrary computation point Q(x, y) on the recording surface 20 is represented by such a complex function as shown in FIG. 32, i.e., $$\Sigma_{k=1-K}(Ak/rk \cos(\theta k + 2\pi rk/\lambda) + i Ak/rk \sin(\theta k + 2\pi rk/\lambda))$$

where k is the distance between the k-th point light source Pk and the computation point Q(x, y). This function holds true for the case where the original image 10 is reconstructed in the rear of the recording medium. When the original image 10 is reconstructed in front of the recording medium, the complex function to be applied is given by $$\Sigma_{k=1-K}(Ak/rk \cos(\theta k - 2\pi rk/\lambda) + i Ak/rk \sin(\theta k - 2\pi rk/\lambda))$$

where the sign of the phase term is minus. In consideration of both, the complex function is given by $$\Sigma_{k=1-K}(Ak/rk \cos(\theta k \pm 2\pi rk/\lambda) + i Ak/rk \sin(\theta k \pm 2\pi rk/\lambda))$$

Figure 33:
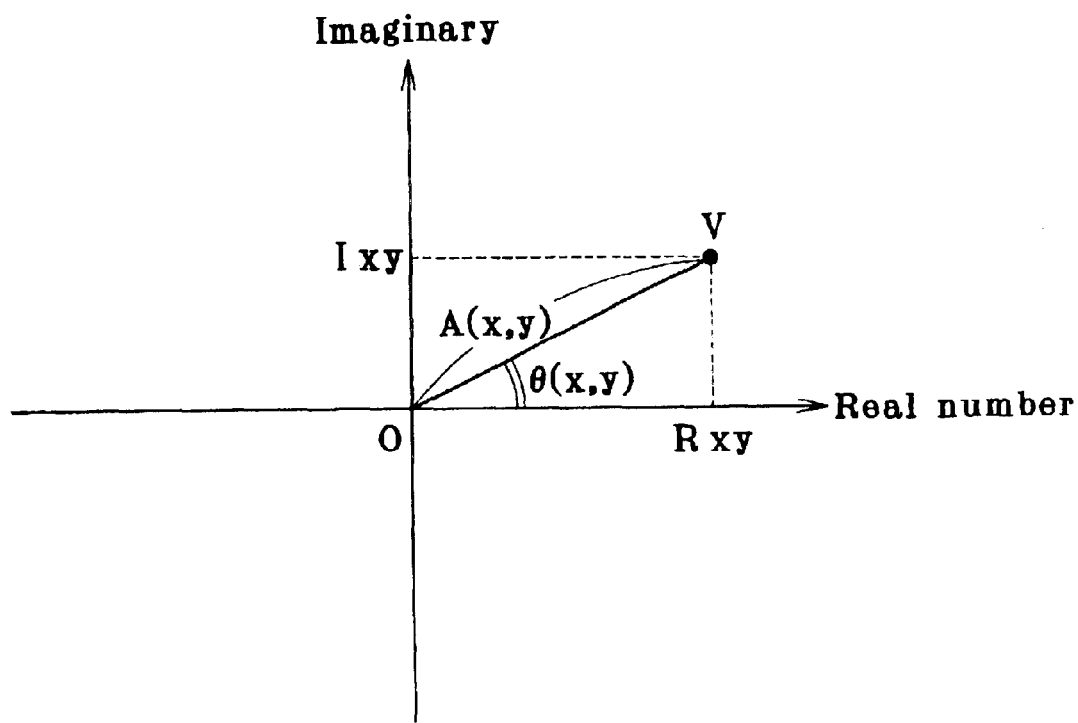
FIG. 33 is illustrative of how amplitude A(x, y) and phase θ(x, y) are found on the basis of an amplitude shown by a coordinate point V on a complex coordinate plane.

If this function is rewritten in the form of Rxy+iIxy where Rxy is a real part and Ixy is an imaginary part, the complex amplitude (an amplitude with consideration given to phase) of this combined wave at the position of the computation point Q(x, y) is represented by a coordinate point V on a complex coordinate plane, as shown in FIG. 33. The result is that the amplitude of the combined wave of object light at the computation point Q(x, y) is given by a distance A(x, y) between the origin O and the coordinate point V on the coordinate plane of FIG. 25, and the phase is given by an angle θ(x, y) of a vector OV with a real number axis.

Thus, the amplitude A(x, y) and phase θ(x, y) of the combined wave of object light at the position of any arbitrary computation point Q(x, y) defined on the recording surface 20 is found by calculation. Hence, the complex amplitude distribution (the distribution of the amplitude and phase of the combined wave of object light) of object light emitted from the original image 10 is obtained on the recording surface 20. The thus obtained complex amplitude distribution is physically recorded on a physical recording medium by some means in such a way that upon illumination with given reconstructing light, the wavefronts of object light are reconstructed. In this way, the original image 10 can be recorded on the physical recording medium.

Figure 34:
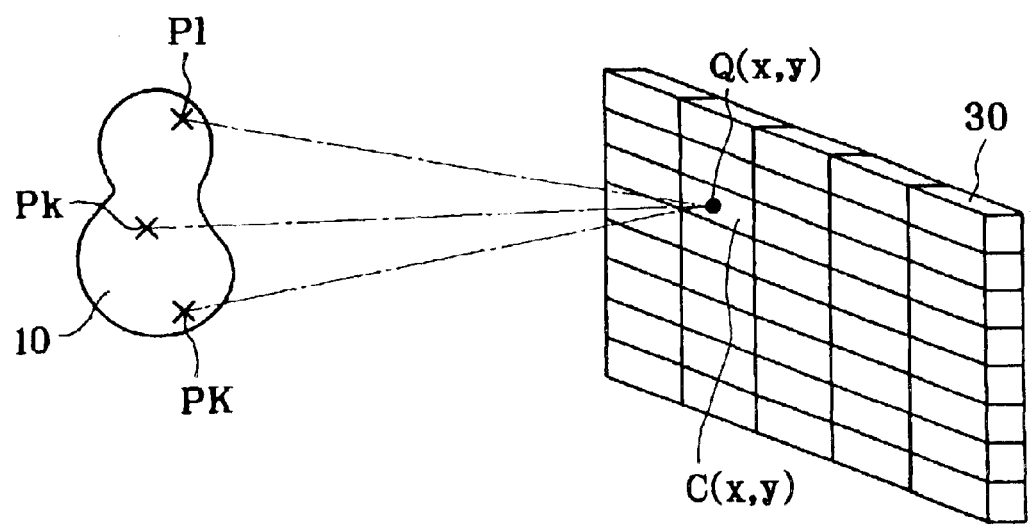
FIG. 34 is a perspective schematic illustrative of one exemplary set 30 of three-dimensional virtual cells defined for the purpose of recording an original image 10.

To record on the recording surface 20 the complex amplitude distribution of object light emitted from the original image 10, a three-dimensional cell may be used. When the complex amplitude distribution is recorded using the three-dimensional cell to record the original image 10 as a hologram, it is preferable to carry out such steps as set forth just below. As shown typically in FIG. 34, a set 30 of three-dimensional virtual cells are first defined at the position of the recording surface 20. In this set 30 of three-dimensional virtual cells, virtual cells in the form of blocks having given size are arranged two-dimensionally in a matrix arrangement. Here, one single virtual cell is assumed to have one computation point therein. Although the computation point may be positioned at any one single point within the cell, it is here understood that the computation point is located at the position of the central point of the front surface of the cell (which faces the original image 10). For instance, an XY coordinate system is defined on the front surface of the three-dimensional virtual cell set 30 (which faces the original image 10). Here, if a virtual cell having a certain computation point Q(x, y) at a position on coordinates (x, y) in this coordinate system is called a virtual cell C(x, y), then the computation point Q(x, y) is positioned at the central point of the front surface of that virtual cell C(x, y). In summary, one single virtual cell should preferably be positioned in the vicinity of one computation point.

On the original image 10, on the other hand, there are defined a multiplicity of sample light sources, as already explained. In the embodiment shown in FIG. 34, the original image 10 is defined as a set of K point light sources P1, P2, ..., Pk, PK. The combined wave of object light, emitted from each point light source with given amplitude and phase, arrives at the computation point Q(x, y). The complex amplitude of this combined wave may be calculated from the aforesaid formulae, and shown as a coordinate point V on the complex coordinate plane shown in FIG. 33. Based on this coordinate point V, the amplitude A(x, y) and phase θ(x, y) are obtained as already set forth. Here, the amplitude A(x, y) and phase θ(x, y) obtained on the computation point Q(x, y) is called a specific amplitude A(x, y) and a specific phase θ(x, y) with respect to said computation point Q(x, y).

The foregoing steps are actually implemented as computation processing using a computer. The results are that specific amplitudes and specific phases can be found on all computation points, and specific amplitudes and specific phases can be found for all virtual cells that form the three-dimensional virtual cell set 30. Accordingly, if these individual virtual cells are replaced by physically substantial cells, then it is possible to fabricate an optical element comprising a set of three-dimensional physical cells (a hologram medium with the original image 10 recorded therein). It is understood that the physical cell used for the virtual cell must have such optical properties as to modulate the amplitude and phase of incident light depending on the specific amplitude and specific phase defined for the virtual cell. To put it another way, the physical cell must have specific optical properties in such a way that upon receipt of specific incident light, the amplitude and phase of the incident light vary depending on the specific amplitude and specific phase defined for the corresponding virtual cell, thereby producing emergent light.

If an optical element comprising a set of physical cells, each having such specific optical properties, is irradiated with given reconstructing illumination light (that is ideally a chromatic light plane wave having the same wavelength as that of object light used in the aforesaid computation processing), then the reconstructing illumination light is modulated by the specific amplitude and phase at an individual physical cell, resulting in reconstruction of the wavefronts of the object light. In this way, the hologram recorded in the optical element is reconstructed.

The construction of the aforesaid physical cell is now explained more specifically. Fundamentally, the physical cell used herein is a three-dimensional cell that is not critical in construction with the exception that a specific amplitude and a specific phase are defined thereon; the essential optical requirement therefor is that upon receipt of given incident light, there is obtained emergent light in which the amplitude and phase of incident light are changed depending on the specific amplitude and specific phase defined on said cell. In short, the physical cell is designed in such a way that a specific amplitude A(x, y) and a specific phase θ(x, y) are recorded with respect to a three-dimensional cell C(x, y) located at a computation point Q(x, Y), and when incident light Lin having amplitude Ain and phase θin is applied to that cell, there is obtained emergent light Lout whose amplitude is Aout=Ain·A(x, y) and whose phase is θout= θin±θ(x, y). The amplitude Ain of incident light changes to the amplitude Aout upon modulation by the specific amplitude A(x, y) recorded in the cell, and the phase θin of incident light changes to the phase θout upon modulation by the specific phase θ(x, y) by the specific phase θ(x, y) recorded in the cell.

One method of amplitude modulation in the three-dimensional cell is to allow the cell to have therein an amplitude modulation region having a transmittance consistent with a specific amplitude. In this case, the whole cell may be designed as an amplitude modulation region or a part of the cell may be provided with an amplitude modulation region. For instance, a cell with an amplitude modulation region having a transmittance of Z % functions as a cell having a specific amplitude represented by A(x, y)=Z/100. As incident light passes through this cell, it is turned by amplitude modulation into emergent light having an amplitude represented by Aout=Ain·Z/100. Setting the transmittance of individual three-dimensional cells at any desired value may be achieved by varying the content of a coloring agent therein.

Another method of amplitude modulation in the three-dimensional cell is to allow the cell to have therein an amplitude modulation region having a reflectivity consistent with a specific amplitude. For instance, a cell with an amplitude modulation region having a reflectivity of Z % functions as a cell in which a specific amplitude represented by A(x, y)=Z/100 is recorded. If incident light having an amplitude Ain is reflected off at this amplitude modulation region, it is then turned by amplitude modulation into emergent light having an amplitude given by Aout=Ain·Z/100. Setting the reflectivity of individual three-dimensional cells at any desired value may be achieved by providing a reflecting surface in the cell (which functions as an amplitude modulation region) and setting the reflectivity of this reflecting surface at any desired value. More specifically, the ratio of reflected light and scattered light may be regulated by varying the surface roughness of the reflecting surface; it is possible to provide a cell having any desired reflectivity by regulation of that reflecting surface.

Yet another method of amplitude modulation in a three-dimensional cell is to allow the cell to have therein an amplitude modulation region having an effective area consistent with a specific amplitude. For instance, referring to a cell having an amplitude modulation region comprising a structure designed such that when the area of a region receiving all of incident light is assumed to be 100%, emergent light effective for the reconstruction of an object image is available from only light incident on a portion having an effective area of Z %, this cell functions as a cell in which a specific amplitude represented by A(x, y)=Z/100 is recorded. That is, even when light having an amplitude Ain is incident on this amplitude modulation region, only Z % of that light leaves as effective emergent light; that emergent light is modulated to an amplitude represented by Aout=Ain·Z/100. To obtain effective emergent light from only a region portion having such a specific effective area, it is preferable to use a cell having a physical pit-and-projection structure.

One method of phase modulation in a three-dimensional cell, on the other hand, is to allow the cell to have therein a phase modulation region having a refractive index consistent with a specific phase. The whole cell may be designed as a phase modulation region or a part of the cell may be provided with a phase modulation region. Between a cell having a phase modulation region formed of a material having a refractive index of n1 and a cell having a phase modulation region formed of a material having a refractive index of n2, there is a difference in the phase of emergent light, even upon the application thereto of incident light having the same phase. Accordingly, if a cell is made up of various materials having varying refractive indices, incident light can then be subjected to any desired phase modulation.

Another method of phase modulation in a three-dimensional cell is to allow the cell to have therein a phase modulation region having an optical path length consistent with a specific phase. The whole cell may be designed as a phase modulation region or a part of the cell may be provided with a phase modulation region. For instance, consider now cells having a phase modulation region formed of the same material having a refractive index of n but having varying optical path lengths. If incident light having the same phase is applied to the cells, there will be a difference in the phase of emergent light. For instance, suppose now that the first cell had a phase modulation region having an optical path length L and the second cell has a phase modulation region having an optical path length 2L and incident light having the same phase were applied to both. Emergent light leaving the second cell will be twice longer than emergent light leaving the first cell in terms of the length of the optical path taken by the incident light through the material having a refractive index of n. Thus, there is some large phase difference. In order to achieve a phase modulation region having any desired optical path length, it is preferable to use a cell having a physical pit-and-projection structure.

Thus, three-dimensional cells having an amplitude modulation function based on a specific amplitude or a phase modulation function based on a specific phase may be achieved by several methods, and any desired selection may be made from the aforesaid several amplitude or phase modulation methods. For instance, if the whole cell is used as an amplitude modulation region formed therein with a transmittance consistent with a specific amplitude and a phase modulation region formed therein with a refractive index consistent with a specific phase, it is then possible to form an optical element by selective arrangement of such 16 physical cells as shown in the table of FIG. 35 with amplitude A as abscissa and phase $\theta$ as ordinate; amplitude A, and phase $\theta$ being divided into four ranges.

The cells depicted in the range with amplitude A corresponding to "0 to 25%" (those in the first row) are formed of a material having a very low transmittance, the cells depicted in the range with amplitude A corresponding to "25 to 50%" (those in the second row) a material having a somewhat low transmittance, the cells depicted in the range with amplitude A corresponding to "50 to 75%" (those in the third row) a material having a somewhat high transmittance, and the cells depicted in the range with amplitude A corresponding to "75 to 100%" (those in the fourth row) a material having a very high transmittance. On the other hand, the cells depicted in the range with phase $\theta$ corresponding to "0 to$\pi/2$" (those in the first column) are formed of a material having a refractive index n1 that is very close to that of air, the cells depicted in the range with phase $\theta$ corresponding to "$\pi/2$ to$\pi$" (those in the second column) a material having a refractive index n2 that is somewhat larger than that of air, the cells depicted in the range with phase $\theta$ corresponding to "$\pi$ to $3\pi/2$" (those in the third column) a material having a refractive index n3 that is larger than that of air, and the cells depicted in the range with phase $\theta$ corresponding to "$3\pi/2$ to $2\pi$" (those in the fourth column) a material having a refractive index n4 that is much larger than that of air.

Thus, in the embodiment shown in FIG. 35, a total of 16 cells having four transmittances and four refractive indices are in readiness for recording. In order to record amplitude and phase in the cells with higher precision, it is preferable to further divide the steps of transmittance and refractive index and keep much more cells in readiness. When the virtual cells are replaced by 16 such physical cells, it is preferable to selectively use physical cells having optical properties closest to those needed for modulation by a specific amplitude and a specific phase defined for each virtual cell.

FIG. 36 is a perspective schematic illustrative of one exemplary structure of a physical cell C(x, y) capable of amplitude modulation and phase modulation by yet another method. As shown, this three-dimensional physical cell has a substantially cuboidal block form, and is provided on its surface with a groove G(x, y). In the embodiment shown, the dimensions of the physical cell C(x, y) are C1=0.6 $\mu$m, C2=0.25 $\mu$m and C3=0.25 $\mu$m, and the dimensions of the groove G(x, y) are G1=0.2 $\mu$m, G2=0.05 $\mu$m and G3=C3= 0.25 $\mu$m. If the physical structure C(x, y) having such structure is used, it is then possible to record amplitude information as the value of the lateral width G1 of the groove G(x, y) and record phase information as the value of the depth G2 of the groove G(x, y). This is because there is a difference in the index of refraction between the interior of the physical cell C(x, y) and the outside air, and so there is a difference in the optical path taken by light through the outside space between light L1 incident vertically on the bottom surface S1 of the groove G(x, y) and light L2 incident vertically on the surfaces S2 of both sides of the groove G(x, y). Accordingly, when virtual cells having a specifically defined amplitude and a specifically defined phase are replaced by physical cells having such structure, it is preferable to use physical cells having a size G1 consistent with the specific amplitude and a size G2 consistent with the specific phase.

Figure 37:
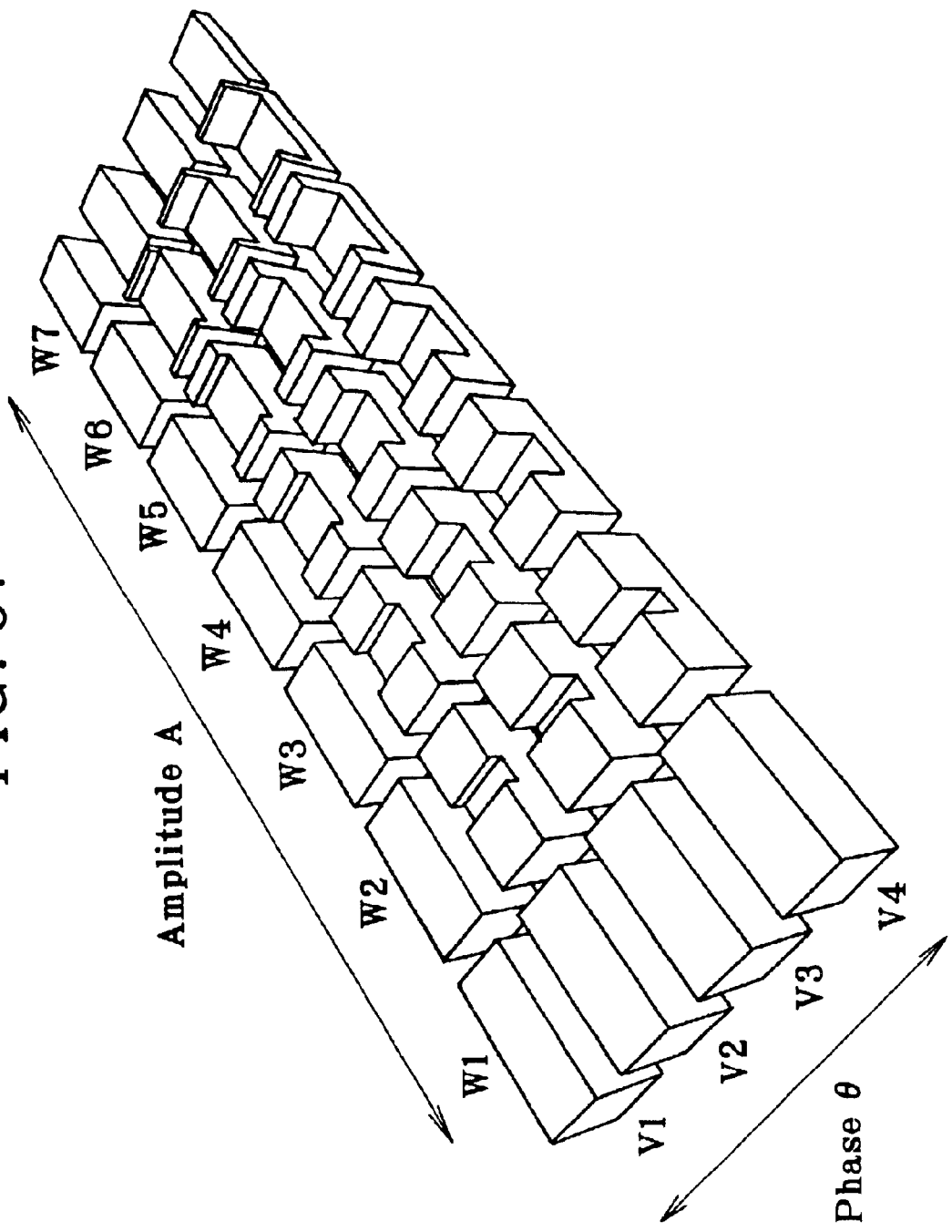
FIG. 37 is a perspective schematic illustrative of a total of 28 physical cells having 7 predetermined groove widths and 4 predetermined groove depths, each cell being defined by such a physical cell C(x, y) as shown in FIG. 36.

In the physical cell C(x, y) having such a groove G(x, y) as shown in FIG. 36, the width G1 and depth G2 of the groove is continuously variable, and so it is theoretically possible to keep unlimited types of physical cells in readiness. It is thus possible to replace virtual cells by physical cells selected from unlimited types of physical cells and having a precise groove width G1 consistent with a specific amplitude on said virtual cells and a precise depth G2 consistent with a specific phase defined thereon. In practical applications, however, it is preferable to select physical cells having optical properties closest to the necessary optical properties from a total of a×b physical cells where a is the number of predetermined groove widths and b is the number of predetermined groove depths. FIG. 37 is a perspective schematic illustrative of a total of 28 physical cells having seven predetermined groove widths and four predetermined groove depths. Each of the 28 physical cells is a physical cell in such a form as shown in FIG. 36. FIG. 37 is thus illustrative of these physical cells being located in a matrix arrangement with four columns and seven rows.

The seven rows of the matrix arrangement shown in FIG. 37 are indicative of variations of amplitude A, and the four columns are indicative of variations of phase $\theta$. For instance, the cells located in the row W1 have a minimum value for amplitude A, and G1=0, i.e., no groove G is provided at all. The amplitude A increases in order from row W2 to W7 or from the left to the right, and the groove width G1 becomes gradually wide, correspondingly. The cells positioned in the row W7 have a maximum value for amplitude A, and the groove width G1=the cell width C1, i.e., the top of each cell is fully cut out. Referring to the columns of the matrix arrangement shown in FIG. 29, for instance, the cells positioned in the column V1 have a minimum value for phase θ, and the groove depth G2=0, i.e., any groove is not provided at all. The phase θ increases in order from V2 to V4 or from above to below, and the groove depth G2 becomes gradually large, correspondingly.

The basic principles of how to record the complex amplitude information of object light have briefly been explained. In short, this method relies on computation of the complex amplitude of object light, instead of computation of the intensity of interference waves of object light and reference light, at the positions of individual computation points. Accordingly, even when the computation of the complex amplitude discussed in §6 instead of the intensity of interference waves is applied to the embodiments discussed in §1 through 5, it is possible to carry out the present invention because there is no substantial modification to the essential technical idea of the present invention.

According to the present invention detailed above, it is possible to fabricate a computer-generated hologram that, even when reconstructed in daily illumination environments, can be observed with master-slave relations as intended.

What we claim is:

1. A process of fabricating a computer-generated hologram with interference fringes recorded on a given recording surface by computer-aided computations, which comprises steps of:

defining 2 to K original images, a recording surface for recording the original images and reference light with which the recording surface is irradiated and which corresponds to the 2 to K original images, defining a multiplicity of sample light sources on each original image, defining a given angle of spreading for object light emitted from individual sample light sources, determining an area on the recording surface, at which object light emitted from all sample light sources defined on one original image arrive with a limited angle of spreading, as a recording area corresponding to said one original image, thereby defining recording areas corresponding to each of the K original images, assigning priorities to a plurality of recording areas when the plurality of recording areas overlap one another on the recording surface, so that a recording area having higher priority is preceded over the rest with respect to an overlapping portion, thereby eliminating the overlapping portion, defining a multiplicity of computation points on the recording surface so that on each computation point, the intensity of interference fringes formed by reference light and object light emitted from sample light sources on the original image corresponding to the recording area to which said computation point is allocated and from which the overlapping has been eliminated is found by computation, and forming interference fringes comprising a distribution of intensities of interference fringes found on each computation point as a hologram on the recording surface.

2. A process for fabricating a computer-generated hologram with an optical pattern recorded on a given recording surface by computer-aided computations, which comprises steps of:

defining 2 to K original images and a recording surface for recording the original images, defining a multiplicity of sample light sources on each original image, defining a given angle of spreading for object light emitted from individual sample light sources, determining an area on the recording surface, at which object light emitted from all sample light sources defined on one original image arrive with a limited angle of spreading, as a recording area corresponding to said one original image, thereby defining recording areas corresponding to each of the K original images, assigning priorities to a plurality of recording areas when the plurality of recording areas overlap one another on the recording surface, so that a recording area having higher priority is preceded over the rest with respect to an overlapping portion, thereby eliminating the overlapping portion, and defining a multiplicity of computation points on the recording surface, so that on each computation point, a complex amplitude at the position of said computation point of object light emitted from sample light sources on the original image, to which said computation point is allocated and from which an overlapping portion has been eliminated, is computed thereby defining a specific amplitude and a specific phase on individual computation points, and locating a physical cell having optical properties consistent with the specific amplitude and specific phase in the vicinity of individual computation points so that a hologram-recording surface for the K original images is formed by a set of physical cells.

3. The computer-generated hologram fabrication process according to claim 1 or 2, wherein:

a position of viewing a hologram reconstructed image is predetermined so that higher priority is assigned to a recording area corresponding to an original image located at a position nearer to the position of viewing.

4. The computer-generated hologram fabrication process according to claim 1 or 2, wherein:

a position of viewing a hologram reconstructed image is predetermined so that higher priority is assigned to a recording area corresponding to an original image located at a position farther off the position of viewing.

5. The computer-generated hologram fabrication process according to claim 1 or claim 2, wherein: the recording surface is located on an XY plane to limit angles of spreading, Ox and Ay, of object light in X-axis and Y-axis directions, said object light being emitted from each sample light source defined as a point light source toward a Z-axis direction.

6. The computer-generated hologram fabrication process according to claim 1 or 2, wherein:

a unit area having given size is defined so that the angle of spreading is defined for individual sample light sources in such a way that object light emitted from one sample light source reaches only within the unit area on the recording surface.

7. The computer-generated hologram fabrication process according to claim 1 or 2, wherein:

the recording surface is located on an XY plane, so that the angle of spreading in an X-axis direction of object light emitted from each sample light source defined as a point light source toward a Z-axis direction is defined as a given angle Ox and the angle of spreading of the object light in a Y-axis direction is defined as an angle satisfying a condition under which object light emitted from one sample light source reaches only within an area on the recording surface and having a given width Ly in the Y-axis direction.

8. The computer-generated hologram fabrication process according to claim 1 or claim 2, wherein:

the recording surface is located on an XY plane and a plurality of sections parallel with an XZ plane are located at a given spacing D, thereby defining sample light sources lined up at a given spacing on a sectional line obtained by cutting the surface of an original image by each section, and each line of intersection of the recording surface with each section is allowed to have a given width thereby forming a strip area and the angle of spreading in a Y-axis direction of object light emitted from sample light sources lined up on a sectional line by a j-th section is defined in such a way as to satisfy a condition under which the object light reaches only within a strip area formed with respect to a line of intersection of the j-th section with the recording surface.

9. A hologram-recorded medium in which a hologram optical pattern fabricated by the computer-generated hologram fabrication process according to claim 1 or claim 2 is recorded on a hologram medium.

10. A hologram-recorded medium in which there is recorded information about a plurality of original images that are located at positions where projected images overlap upon projection onto a recording surface in a direction vertical thereto, wherein:

on the recording surface of the medium there are formed a plurality of recording areas that do not spatially overlap one another, and in one recording area there is recorded only information about object light emitted from a multiplicity of sample light sources that form one of the plurality of original images to be recorded, wherein said one recording area includes an area where a projected image of said one original image overlaps with a projected image of another of said plurality of original images.

11. The hologram-recorded medium according to claim 10, wherein the plurality of original images are located at positions where projected images overlap upon projection onto the recording surface in a direction vertical thereto.

12. The hologram-recorded medium according to claim 10, wherein said recorded information in said one recording area includes interference fringes, said interference fringes based on the intensity of said interference by a reference light and said sample light sources that form said one of the plurality of original images to be recorded.

13. The hologram-recorded medium according to claim 10, wherein said recorded information includes a plurality of physical cells, said physical cells having optical properties consistent with the specific amplitude and specific phase of the object light emitted from the sample light sources.

14. The hologram-recorded medium according to one of claims 10–13, wherein said projected images include all the sample light sources defined on the one of the plurality of original images to be recorded, and wherein said sample light sources arrive at said recording area with a limited angle of spreading.

* * * * *